United States Patent
Sternitzke

(10) Patent No.: US 12,353,215 B2
(45) Date of Patent: Jul. 8, 2025

(54) METHOD AND A SYSTEM FOR CONVEYING A ROBOT IN AN ELEVATOR

(71) Applicant: METRALABS GMBH NEUE TECHNOLOGIEN UND SYSTEME, Ilmenau (DE)

(72) Inventor: Christian Sternitzke, Leipzig Sachsen (DE)

(73) Assignee: METRALABS GMBH NEUE TECHNOLOGIEN UND SYSTEME, Ilmenau (DE)

( * ) Notice: Subject to any disclaimer, the term of this patent is extended or adjusted under 35 U.S.C. 154(b) by 225 days.

(21) Appl. No.: 17/797,900

(22) PCT Filed: Feb. 9, 2021

(86) PCT No.: PCT/EP2021/053113
§ 371 (c)(1),
(2) Date: Aug. 5, 2022

(87) PCT Pub. No.: WO2021/160623
PCT Pub. Date: Aug. 19, 2021

(65) Prior Publication Data
US 2023/0039466 A1 Feb. 9, 2023

(30) Foreign Application Priority Data
Feb. 10, 2020 (DE) .................... 10 2020 103 308.7

(51) Int. Cl.
*G05D 1/00* (2024.01)
*B66B 1/46* (2006.01)
(Continued)

(52) U.S. Cl.
CPC ........... *G05D 1/0225* (2013.01); *B66B 1/468* (2013.01); *G06T 7/70* (2017.01); *G06V 10/764* (2022.01);
(Continued)

(58) Field of Classification Search
CPC .......... B66B 1/34; B66B 1/468; B66B 17/20; B66B 2201/463; G05D 1/0225;
(Continued)

(56) References Cited

U.S. PATENT DOCUMENTS

2019/0218060 A1 7/2019 Koba
2019/0248013 A1 8/2019 Deyle

FOREIGN PATENT DOCUMENTS

| CN | 108002154 A | 5/2018 |
| JP | 2002302353 A | 10/2002 |

OTHER PUBLICATIONS

Kang, Jeong-Gwan, Su-Yong An, Won-Seok Choi, and Se-Young Oh. "Recognition and path planning strategy for autonomous navigation in the elevator environment." International Journal of Control, Automation and Systems 8 (2010): 808-821.*
(Continued)

*Primary Examiner* — Jason Holloway
*Assistant Examiner* — Blake A Wood
(74) *Attorney, Agent, or Firm* — RAPHAEL BELLUM PLLC

(57) ABSTRACT

The invention comprises a method and a system for conveying a mobile robot in an elevator involving the monitoring of elevator operating components and of persons surrounding the elevator and operating the elevator by selecting a floor to which the mobile robot is to move. In one aspect an inertial sensor is used to learn or determine the number of floors. The robot may also have methods implemented to assess the floor space inside the elevator or to position itself in front of the elevator in such a way that it can, for example, monitor the operation of elevator operating components without being perceived as an obstacle from the elevator users' perspective.

20 Claims, 15 Drawing Sheets

Figure 6:
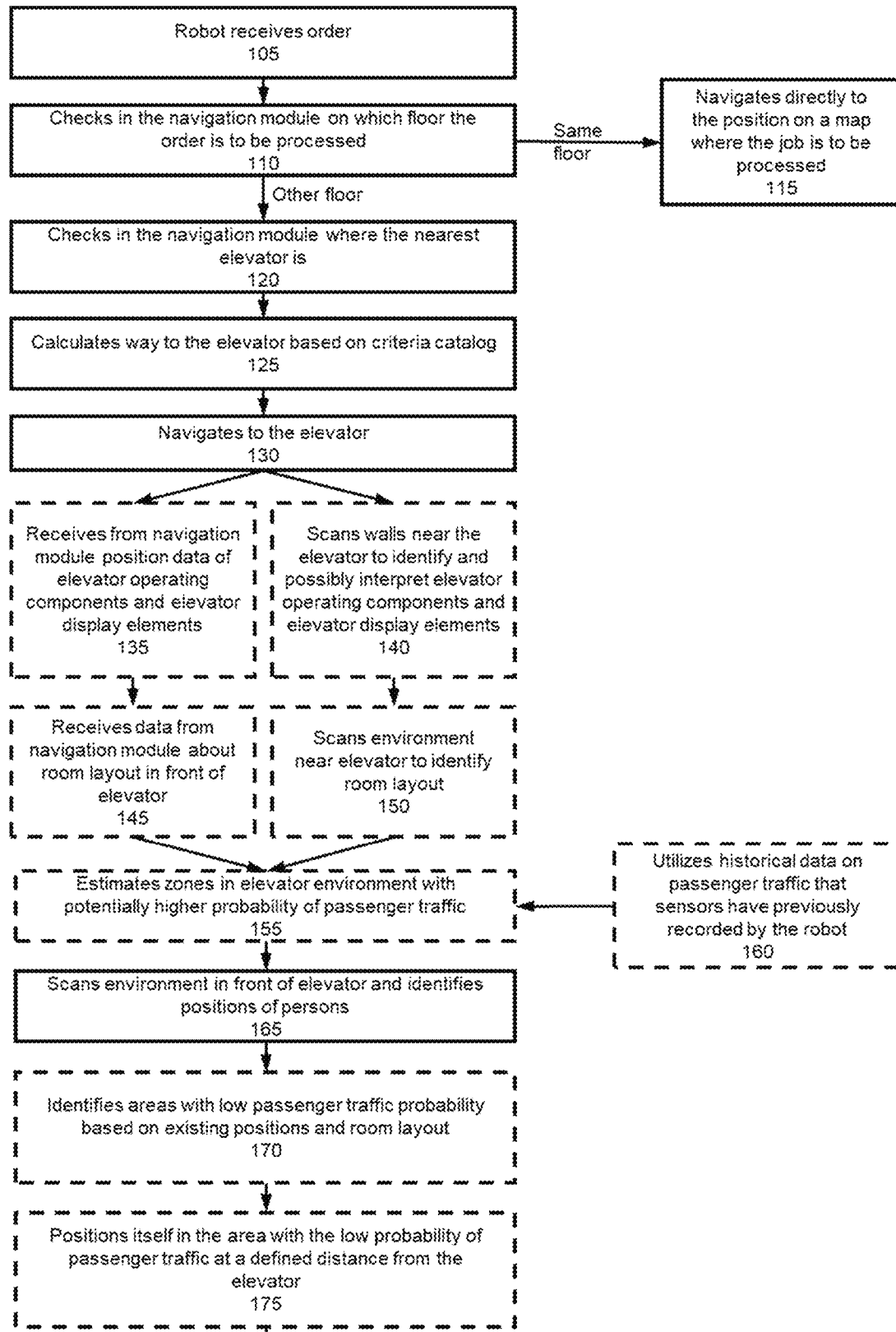

(51) Int. Cl.
   *G06T 7/70* (2017.01)
   *G06V 10/764* (2022.01)
   *G06V 20/52* (2022.01)
   *G06V 40/10* (2022.01)
(52) U.S. Cl.
   CPC .............. *G06V 20/52* (2022.01); *G06V 40/10* (2022.01); *B66B 2201/463* (2013.01); *G05D 1/0242* (2013.01); *G05D 1/0246* (2013.01); *G06T 2207/30196* (2013.01)
(58) Field of Classification Search
   CPC ...... G05D 1/0242; G05D 1/0246; G06T 7/70; G06T 2207/30196; G06V 10/764; G06V 20/52; G06V 40/10
   See application file for complete search history.

(56) References Cited

OTHER PUBLICATIONS

Kang, Jeong-Gwan, Su-Yong An, and Se-Young Oh. "Navigation strategy for the service robot in the elevator environment." In 2007 International Conference on Control, Automation and Systems, pp. 1092-1097. IEEE, 2007.*

McAree, Owen, Jonathan M. Aitken, Luke Boorman, David Cameron, Adriel Chua, Emily C. Collins, Samuel Fernando, James Law, and Uriel Martinez-Hernandez. "Floor determination in the operation of a lift by a mobile guide robot." In 2015 European Conference on Mobile Robots (ECMR), pp. 1-6. IEEE, 2015.*

An, Su-Yong, Jeong-Gwan Kang, Won-Seok Choi, and Se-Young Oh. "A neural network based retrainable framework for robust object recognition with application to mobile robotics." Applied Intelligence 35 (2011): 190-210.*

Veloso, Manuela M., Joydeep Biswas, Brian Coltin, Stephanie Rosenthal, Susana Brandao, Tekin Mericli, and Rodrigo Ventura. "Symbiotic-autonomous service robots for user-requested tasks in a multi-floor building." (2012).*

Jiang, Shenlu, Wei Yao, Man-Sing Wong, Meng Hang, Zhonghua Hong, Eun-Jin Kim, Sung-Hyeon Joo, and Tae-Yong Kuc. "Automatic elevator button localization using a combined detecting and tracking framework for multi-story navigation." IEEE Access 8 (2019): 1118-1134.*

Troniak, Daniel, Junaed Sattar, Ankur Gupta, James J. Little, Wesley Chan, Ergun Calisgan, Elizabeth Croft, and Machiel Van der Loos. "Charlie rides the elevator . . . " In 2013 international conference on computer and robot vision, pp. 1-8. IEEE, 2013.*

Backhaus, Nils, Patricia H. Rosen, Andrea Scheidig, Horst-Michael Gross, and Sascha Wischniewski. "Somebody help me, please?! interaction design framework for needy mobile service robots." In 2018 IEEE workshop on advanced robotics and its social impacts (ARSO), pp. 54-61. IEEE, 2018.*

Rosenthal, Stephanie, Manuela Veloso, and Anind K. Dey. "Task behavior and interaction planning for a mobile service robot that occasionally requires help." In Workshops at the Twenty-Fifth AAAI Conference on Artificial Intelligence. 2011.*

Islam, Kh Tohidul, Ghulam Mujtaba, Ram Gopal Raj, and Henry Friday Nweke. "Elevator button and floor No. recognition through hybrid image classification . . . " In 2017 International Conference on Engineering Technology and Tech. (ICE2T), pp. 1-4. IEEE, 2017.*

Zhao, Junxin, Yujing Chen, and Yunjiang Lou. "A human-aware robotic system for mobile robot navigating in multi-floor building with elevator." In 2019 WRC Symposium on Advanced Robotics and Automation (WRC SARA), pp. 178-183. IEEE, 2019.*

Zhu, Delong, Tingguang Li, Danny Ho, Tong Zhou, and Max QH Meng. "A novel OCR-RCNN for elevator button recognition." In 2018 IEEE/RSJ International Conference on Intelligent Robots and Systems (IROS), pp. 3626-3631. IEEE, 2018.*

Dong, Zijian, Delong Zhu, and Max Q-H. Meng. "An autonomous elevator button recognition system based on convolutional neural networks." In 2017 IEEE International Conference on Robotics and Biomimetics (ROBIO), pp. 2533-2539. IEEE, 2017.*

Kim, Heon-Hui, Dae-Jin Kim, and Kwang-Hyun Park. "Robust elevator button recognition in the presence of partial occlusion and clutter by specular reflections." IEEE Transactions on Industrial Electronics 59, No. 3 (2011): 1597-1611.*

International Search Report and Written Opinion of PCT International Application No. PCT/EP2021/053113, dated Jun. 15, 2021.

* cited by examiner

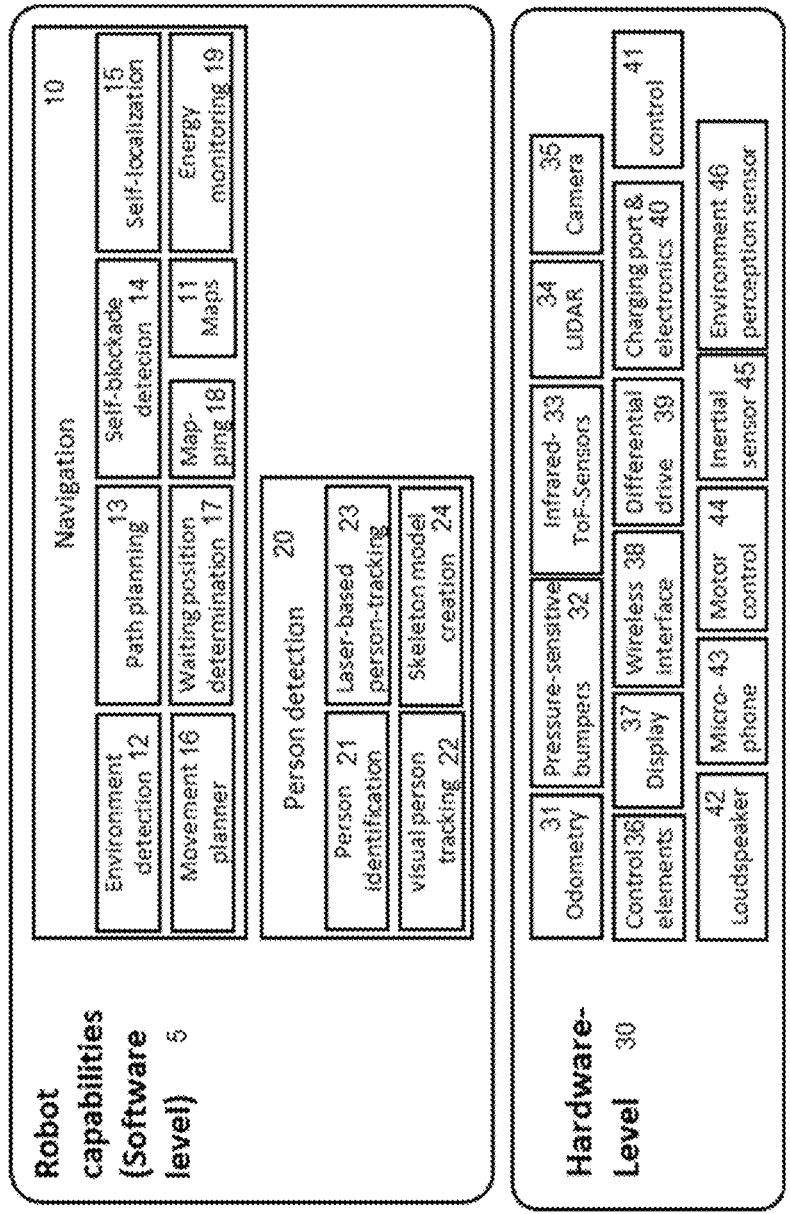
Fig. 1 Possible architecture of the robot

Fig. 2 Robot and system connected to the robot
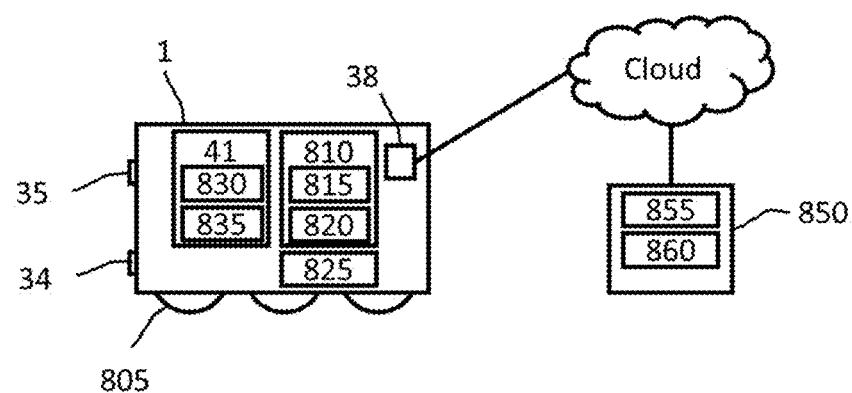

Fig. 3 Method for positioning a robot in front of the elevator

Fig. 4 Elevator operating components and elevator display elements outside the elevator
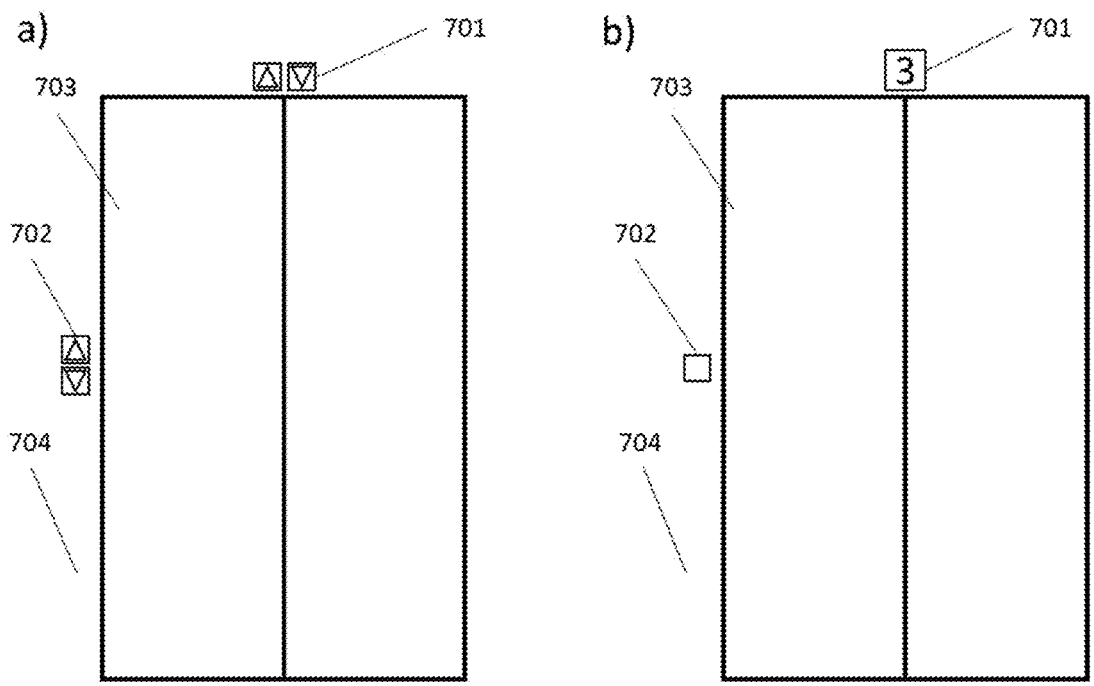
Fig. 5 Elevator operating components and elevator display elements inside the elevator
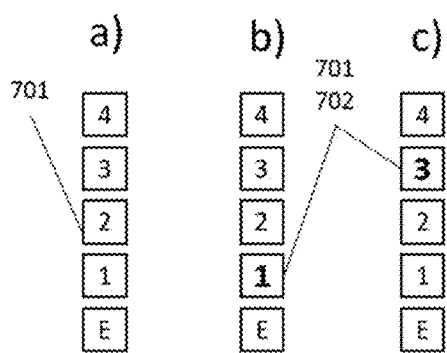

Fig. 6 Method of addressing people in front of the elevator
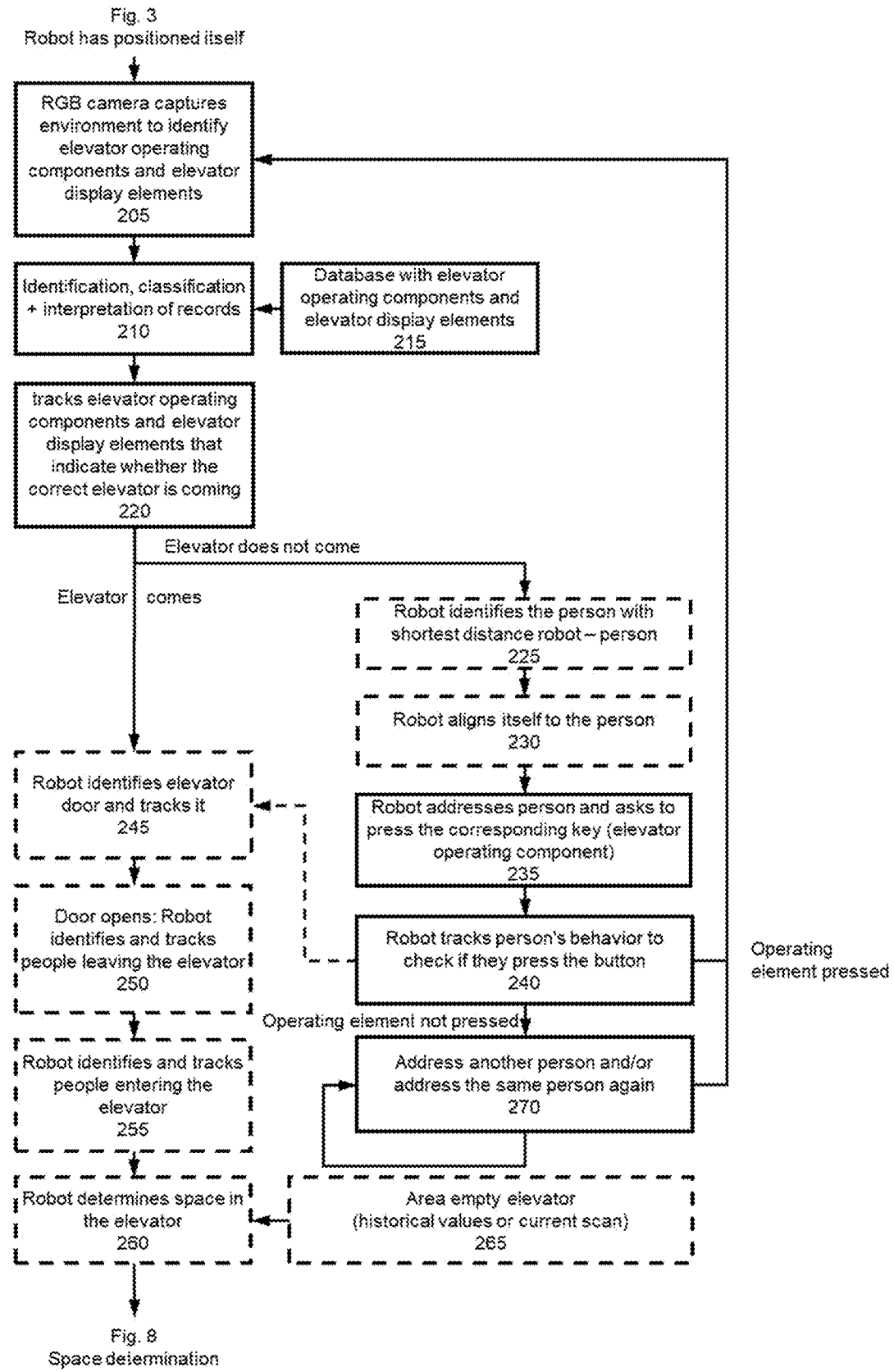

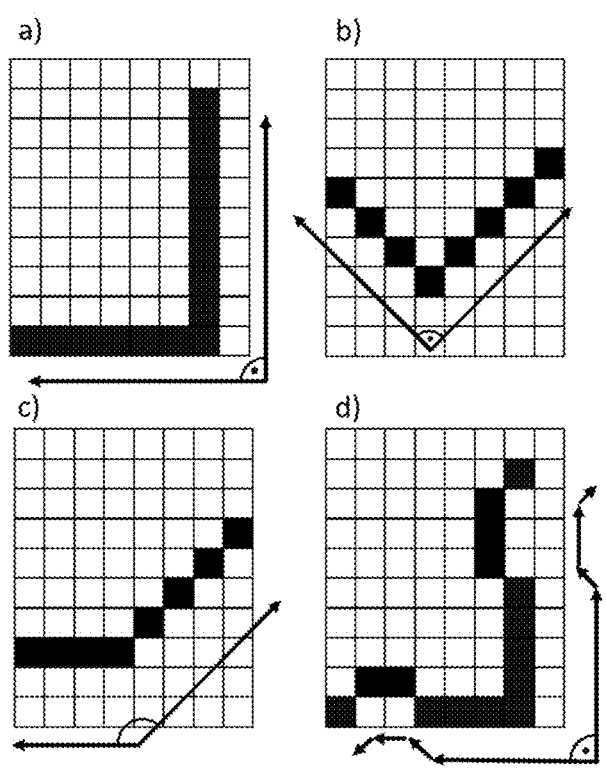
Fig. 7 Occupancy grid map

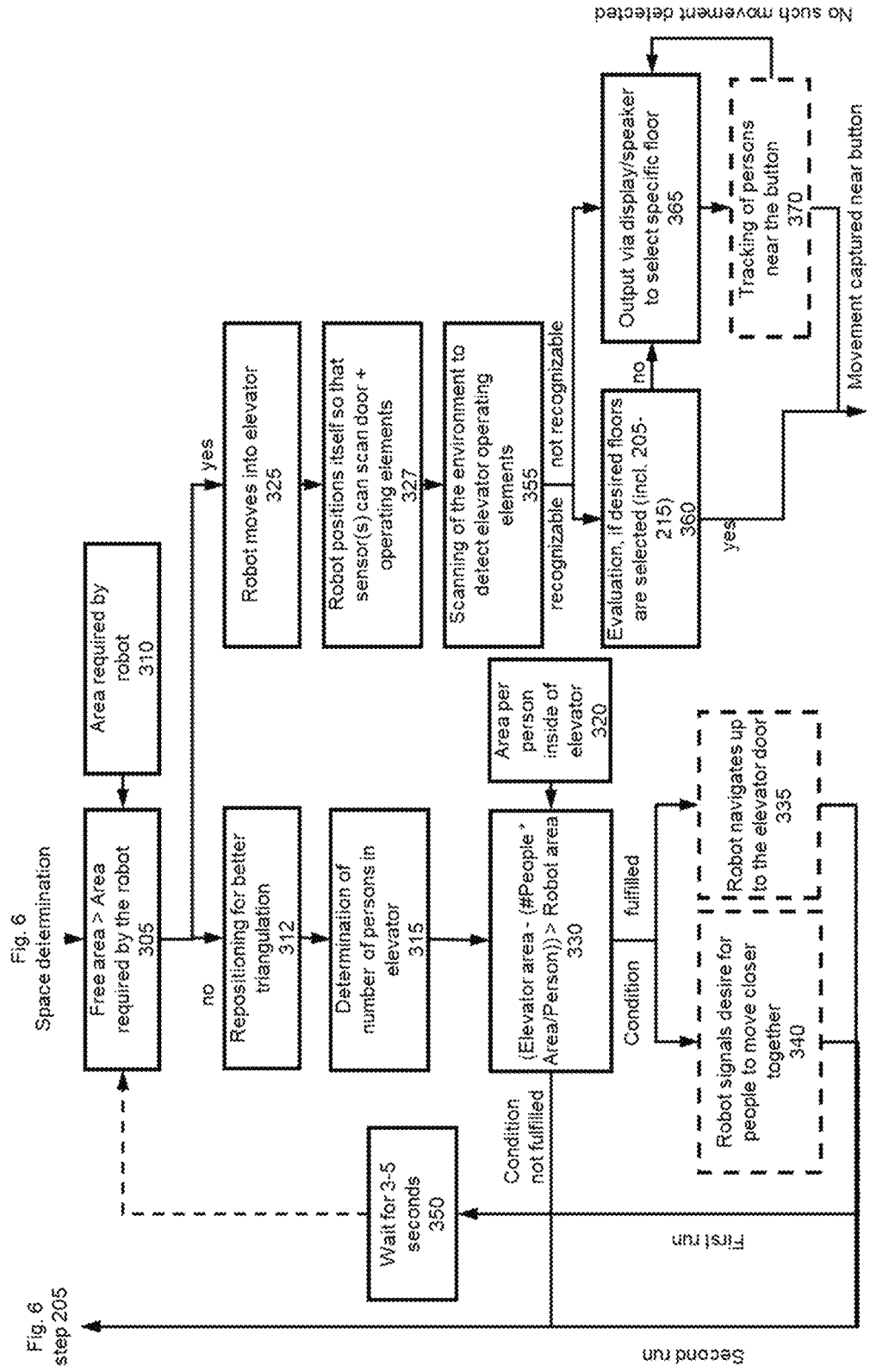

Fig. 9 Method for recognition of the number of floors
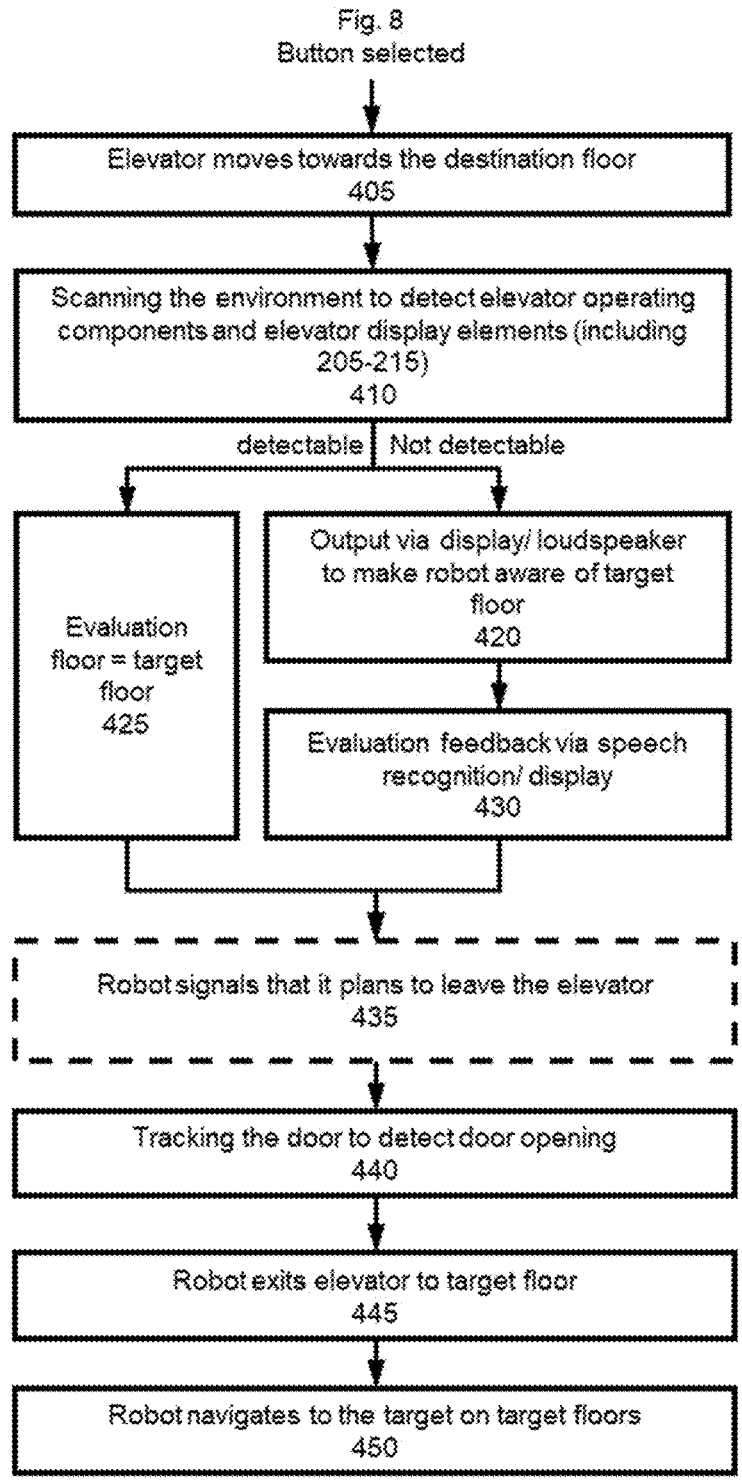

Fig. 10 Passenger flows and waiting positions in front of the elevator
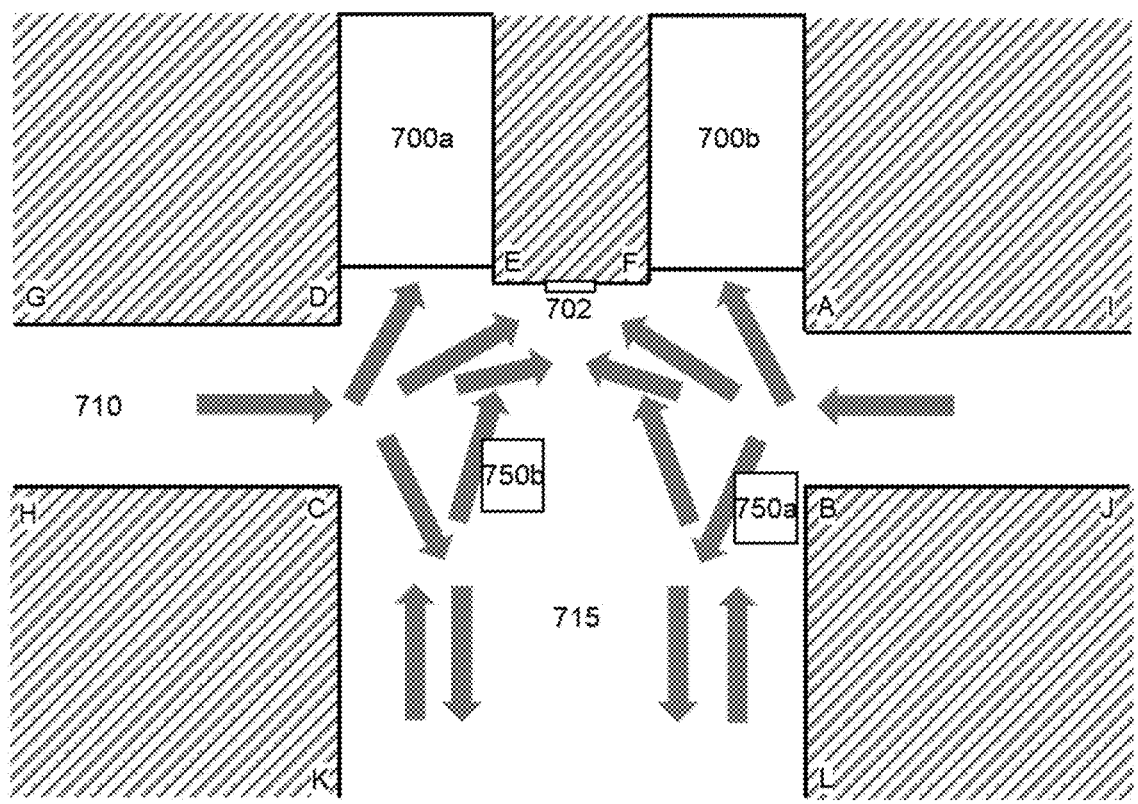

Fig. 11 Method for consideration of the weight and elevator load of the robot
a)
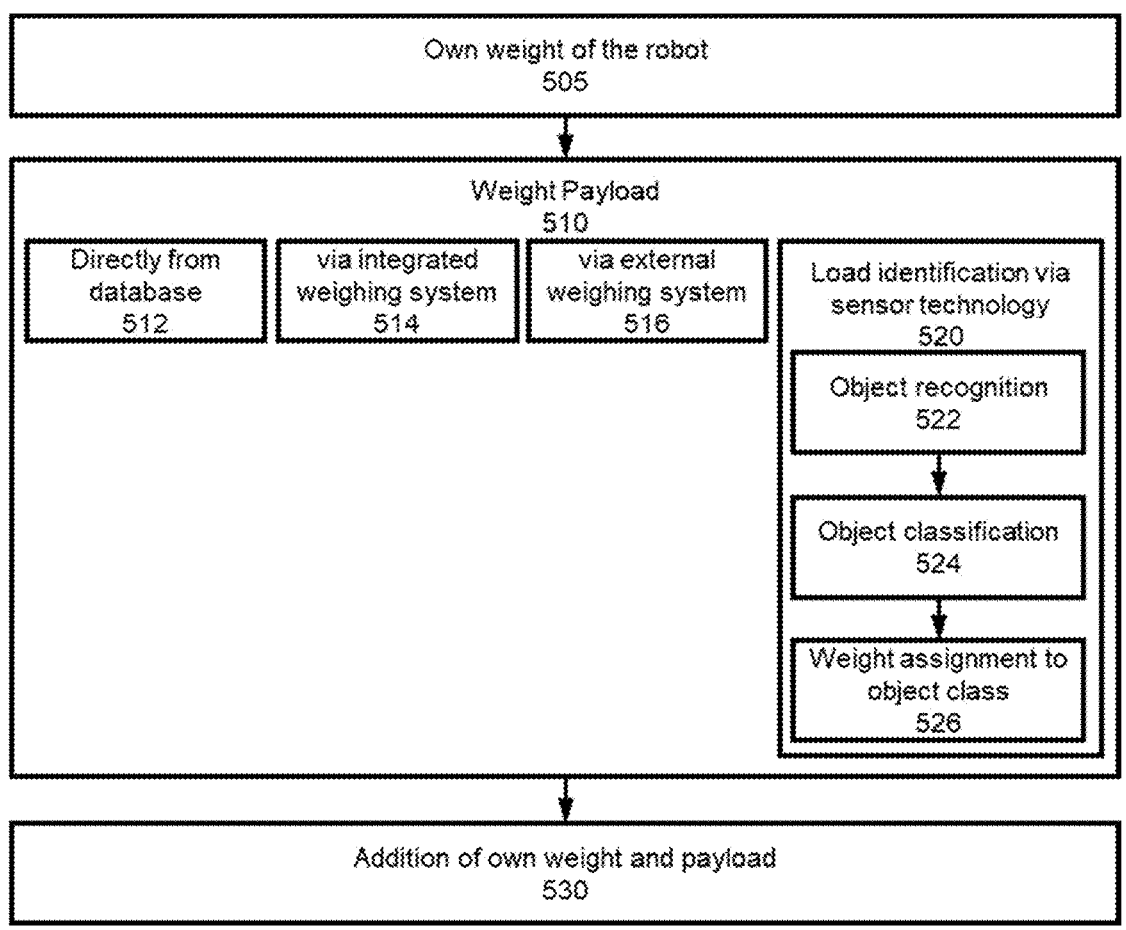

Fig. 11 Method for consideration of the weight and elevator load of the robot b)
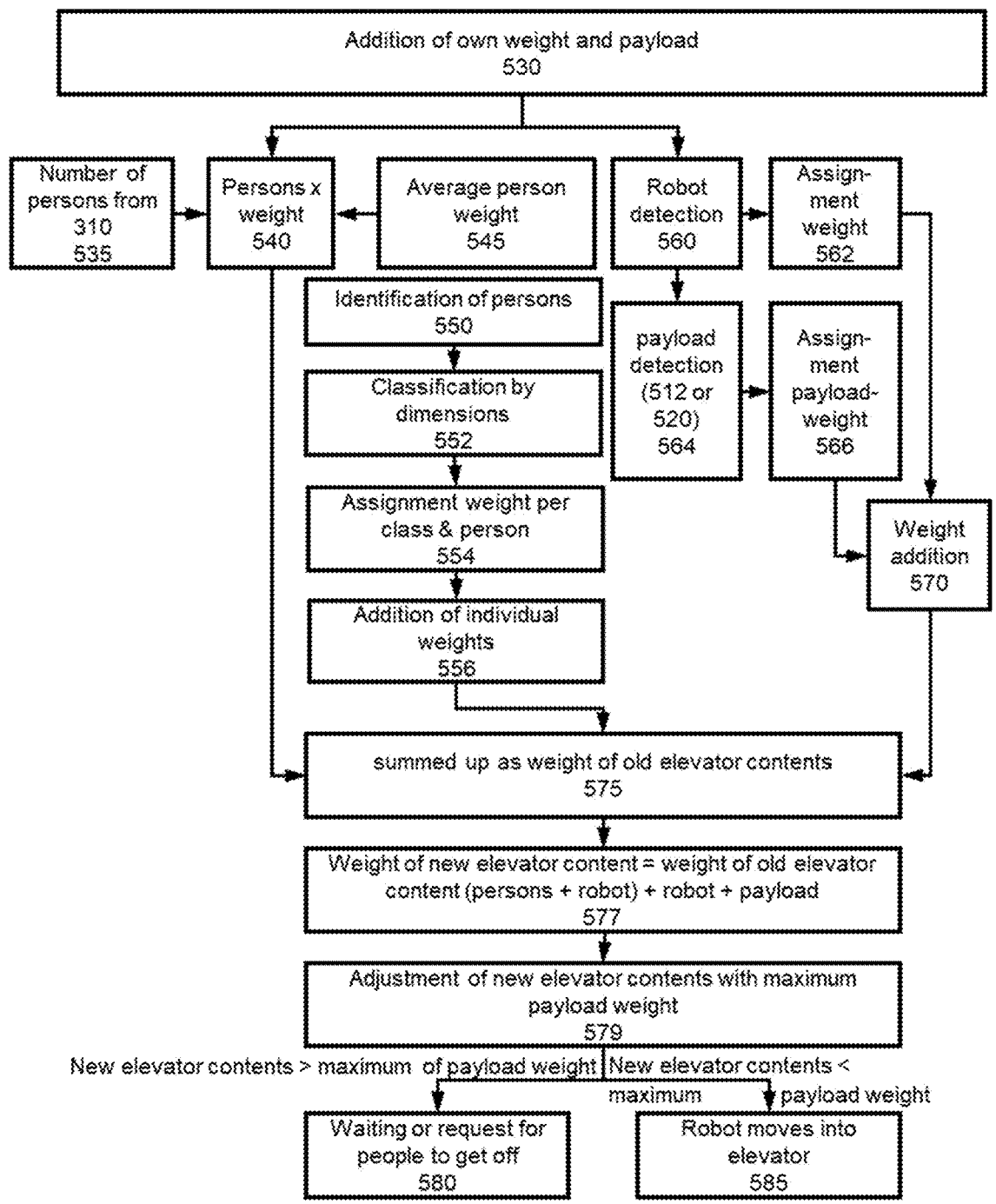

Fig. 12 Method for determination of the floor
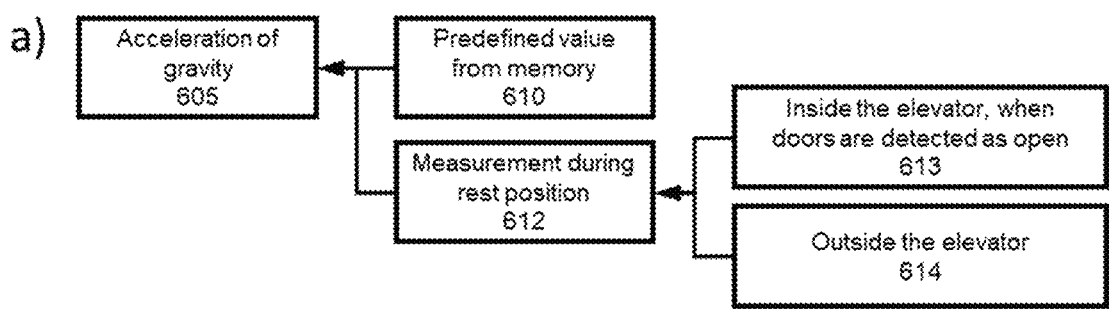

Fig. 12 Method for determination of the floor
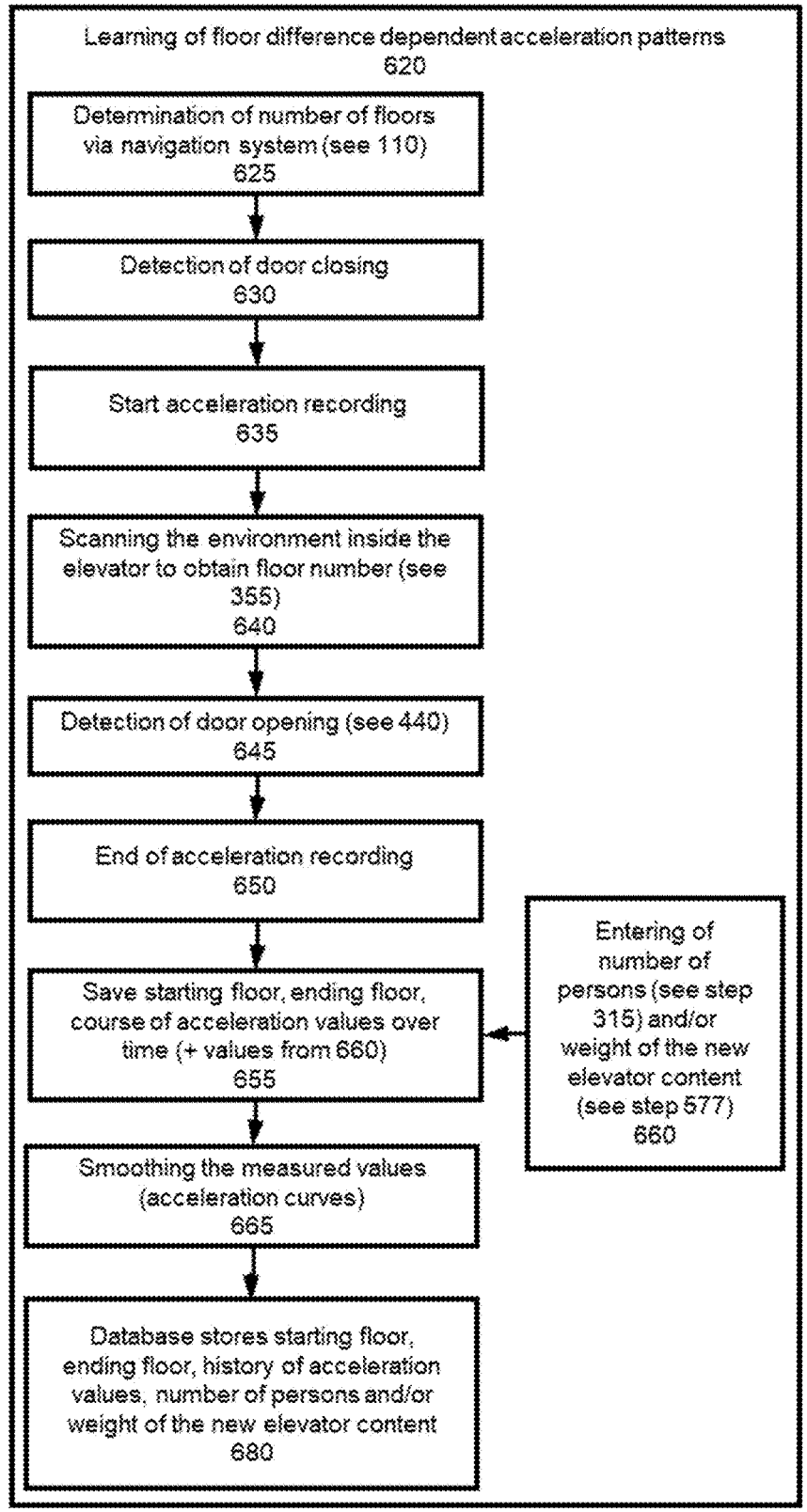

Fig. 12 Method for determination of the floor
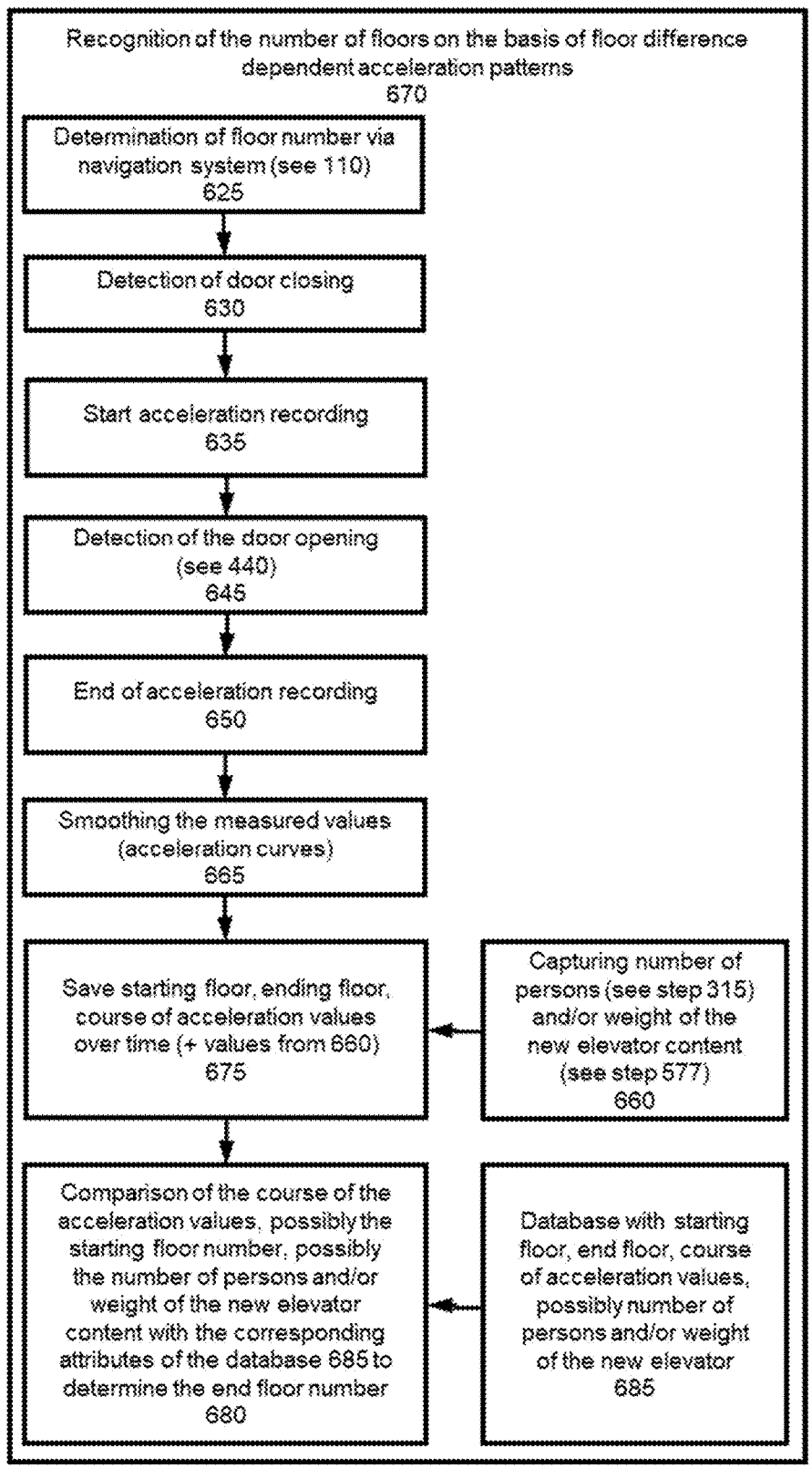

Fig. 13 System for implementation within an elevator.
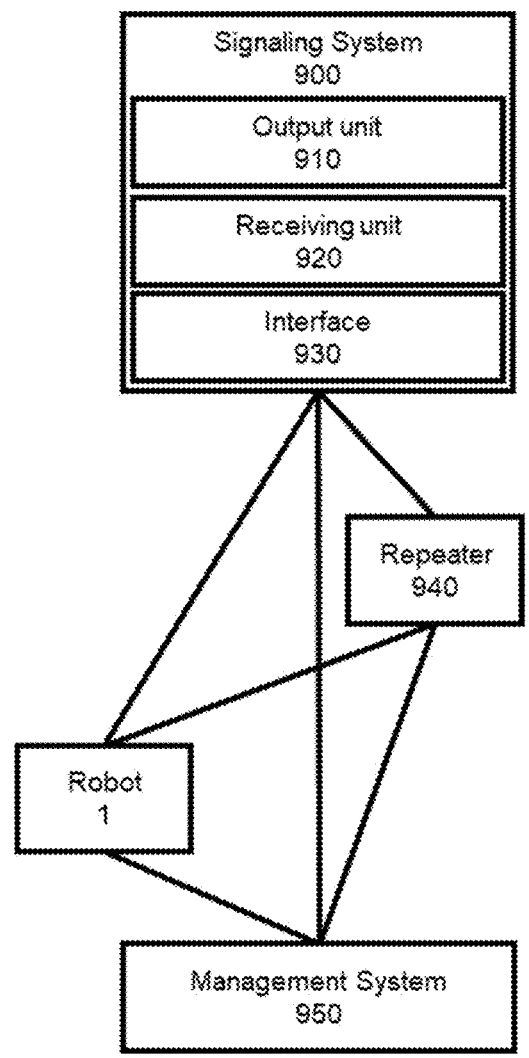

METHOD AND A SYSTEM FOR CONVEYING A ROBOT IN AN ELEVATOR

AREA OF THE INVENTION

The invention comprises a method and a system for conveying a robot in an elevator.

BACKGROUND OF THE INVENTION

In the context of increasing automation, more and more tasks are taken over by robots. This applies not only to robots that are installed stationary at production lines, but also to mobile robots that move autonomously, especially inside buildings. These include transport robots, which are used in warehouses, for example, to transport goods from one position to another in the warehouse, but also those robots that interact directly with humans, be it robots that are available as mobile information portals, that perform diagnoses or therapies on humans, or even those that support humans directly through actuators in physical activities.

All these activities can be performed inside buildings. Sometimes the robot has to operate on several floors or levels of a building. For example, the robot can be instructed to transport a load from one floor to the next floor, or the robot can have its loading station on one floor, but on the other floor it has to fulfill the task of providing information or collecting data via its sensors, for example in the context of diagnosis or therapy.

The robot must use an elevator if the robot is not able to climb stairs. The following revelation describes an implementation of a robot that allows this use of an elevator without the robot interacting with the elevator controller electronically and without knowing the height of a floor. Instead, the system, device, and method are designed to interact with people who also want to use the elevator. For this purpose, the robot has various navigation and detection capabilities to observe its environment and derive the correct number of floors, but also to minimize interference with the movements of people in its environment.

PRIOR ART

In the prior art, many approaches are known that describe data exchange between a robot and an elevator control system via an interface. This includes CN108455393, CN108861905, CN105600631, CN105858383, CN105881553, CN107055241, CN108002151, CN108163653, CN109205406, CN108382933, KR20100077920, KR20100080278, JP2011088721, JP2012106866, JPH05210414, JPH05210414, JP2005018382, JP2007210801, JP2009051617. In the prior art there is also the paradigm that robots and humans should not use an elevator at the same time (JP2012106866 JP2005053671, JP2006089262, JP2007210801, JP2009051617), so that the robot for example only uses an elevator if there are no humans in it (CN105881553), the elevator does not allow humans to enter it when the robot uses it, etc. The reason for this may be that the robot could endanger people through its navigation by accidentally colliding with the people in the elevator.

In the prior art there are solutions that are based on the localization of the floor, both in front of the elevator and inside the elevator display elements display record and evaluate the recordings to identify which floor is displayed or whether the elevator is on the way. If no elevator displays are visible, the robot make a time estimation (CN105565094).

The elevator is operated in different ways according to the prior art. In one aspect, robots are described with actuators that are configured to press the elevator buttons (CN107538463, CN108297061, JP2008162758).

Another approach (CN108002154) aims at having the robot communicate via voice output with people in its environment in such a way that these people first press the elevator call button. The robot monitors the opening status of the elevator door and enters the elevator after opening. The robot prompts the persons via voice output to press the floor button in the elevator. The robot detects the number of floors by measuring the air pressure and leaves the elevator after opening the door to navigate to its target position on the target floor. For this evaluation it is necessary to determine the floor height in order to determine the number of floors correctly.

In another approach (EP3453663), a robot monitors the floor on which the robot is located by means of an acceleration sensor. The robot receives information about the instantaneous acceleration due to gravity in a static state in the elevator and about the acceleration of the robot in a moving state in the elevator, as well as an initial floor number. Furthermore, information about the floor height is necessary. With this information the robot can calculate its position and floor.

CN107826917 uses a noise source that serves as a reference mark for floor identification and whose sound intensity is used to determine the distance travelled by the robot, whereby floors are each assigned an intensity level that is compared with the sound intensity detected by the robot on the floor.

CN108002154 describes a robot that has an air pressure sensor and detects changes in air pressure to indicate changes in the floor.

JP2009258821 describes a robot which is able to adjust the weight of its payload based on a maximum payload weight of an elevator or which can also influence the maximum payload weight of an elevator. In JP2012106866 an elevator measures the weight and gives feedback to a robot to modify its weight.

BRIEF DESCRIPTION OF THE INVENTION

In this document, a computer-implemented method for transporting a robot in an elevator to a predetermined floor is revealed. The method includes: detecting persons in the vicinity of the robot, identifying an elevator operating component for the elevator, monitoring the elevator operating component or elevator display element to identify selected floors, and prompting at least one of the detected persons to select the predetermined floor using the elevator operating component.

In one aspect of the procedure, monitoring of the elevator operating component includes monitoring of body part positions, e.g. the positions of fingers or hands of at least one of the captured persons when selecting the floors using the elevator operating component. This detection of persons can be done by creating a so-called skeleton model and thus the monitoring of body part positions is done on the basis of detected joint points e.g. at the wrist from the skeleton model.

One aspect of the procedure also includes the determination of a distance between the elevator operating components and the body part positions of at least one of the detected persons. The distance can be calculated and an event is triggered if the distance falls below a threshold value. The event can include, for example, a call to the elevator, a selection of the predetermined floor, or a request to one of the detected persons to select the predetermined floor using the elevator operating component.

The recognition of the elevator operating component is done by capturing an image and classifying the captured image. The sensing of an elevator display element allows the recognition of the floor of the elevator. The recognized floor can also be compared with the predetermined floor.

When the robot reaches the predetermined floor, it exits the elevator.

In a further aspect, the method also includes placing the robot in a robot position in front of the elevator, wherein the robot position is selected such that a distance between the robot position and an elevator door from the elevator depends on a predetermined speed of the robot and an opening time of the elevator door or on the probability of hitting a moving obstacle.

The procedure can additionally include the determination of a sufficiently large free area for the robot in the elevator.

This description also reveals a system for conveying a robot in an elevator to a predetermined floor with the following features: at least one sensor for detecting persons in the vicinity of the robot, at least one camera for recording images of an elevator operating component in or in front of the elevator (which may be identical with said sensor), an output unit for issuing prompts to persons in the elevator, and an image classification unit for detecting a selected floor by comparing the recorded images with stored patterns in a database. The system may also include a person recognition module to create a skeleton model of the persons. The camera allows to capture images of an elevator display element.

In another aspect, the system contains at least one memory. The memory contains e.g. rules for detecting the distance between an elevator operating component and a body part, rules for detecting the operation of the elevator, rules for detecting the direction of movement of the elevator, rules for detecting the target floor of the elevator, rules for selecting a robot position for placing the robot in front of an elevator door of the elevator, or rules for detecting the free space inside the elevator.

DRAWINGS

The invention is now described in more detail by means of the following drawings:

FIG. 1 Possible architecture of the robot;
FIG. 2 Robot and system connected to the robot
FIG. 3 Method for positioning a robot in front of the elevator;
FIG. 4 Elevator operating components and elevator display elements outside the elevator
FIG. 5 Elevator operating components and elevator display elements inside the elevator
FIG. 6 Method of addressing people in front of the elevator;
FIG. 7 Occupancy grid map
FIG. 8 Method of space determination within the elevator;
FIG. 9 Method for recognition of the number of floors;
FIG. 10 Passenger flows and waiting positions in front of the elevator
FIG. 11 Method for consideration of the weight and elevator load of the robot;
FIG. 12 Method for the determination of the floor;
FIG. 13 System for implementation within an elevator.

DETAILED DESCRIPTION OF THE INVENTION

A possible implementation of the robot 1 described in this document is shown in FIG. 1 (system architecture) (and partially also FIG. 2). For example, the robot 1 has at least three wheels 805, of which at least two are drive wheels. The drive wheels are controlled by a control 41 and are powered by a power source, e.g. an accumulator 825. Furthermore, the robot 1 has a device for re-powering the power source itself, in one aspect an interface for docking to a charging station for charging the accumulator 825, and the necessary electronics (i.e. a charging port and charging electronics 40). The control 41 is equipped with a control processing unit 830 and a control memory 835, while the robot 1 can also be equipped with additional servers or processing units.

The robot 1 can have a display 37, a loudspeaker 42 and, if necessary, a microphone 43 and/or control elements 36. The robot 1 is equipped with at least one wireless interface 38, e.g. a WLAN or GSM/UMTS/LTE/5G module. Alternatively, in an optional aspect, the at least one wireless interface 38 can be provided for the control (monodirectional) and/or bidirectional communication of building-related systems such as the remote controlled opening and closing of (automatic) doors, for triggering signals of optical and/or acoustic signalling devices, etc. Bluetooth, ZigBee, ISM/433/868 MHz (Sub-1-Ghz) transceiver or infrared (IrDA) are used as transmission standards. Likewise, switches/buttons or input devices can be installed in the building or in the driving area at known locations in order to call the robot 1 e.g. to the location (e.g. pick up the transported goods) or to trigger other specific actions, which communicate via the wireless interface 38. Information is exchanged via at least one wireless interface 38 using a transmission protocol. During this information exchange, e.g. in an optional aspect with time reference (time stamp), information such as the position of robot 1 (e.g. on a map), the current speed and the planned route is transmitted. If the robot 1 receives the route of another robot, this received route is entered as a dynamic obstacle in the map of (first) robot 1 and/or considered in path planning in the path planning module 13, for example if a distance threshold between the first robot 1 and the other robot is underrun. The robot 1 has e.g. at least one LIDAR 34, which is connected to one of the computers or processors. In an alternative or complementary aspect, at least one camera 35 can also be used, e.g. an RGB-D camera with speckle or time-of-flight (ToF) technology.

At the robot capability level (software level) 5, the robot 1 is equipped with a navigation module 10, an environment sensing module 12 for 2D/3D environment sensing that e.g. further processes data from the environment perception sensor 46 and a mapping module 18 for mapping the environment in which the robot 1 moves. This means that the robot 1 senses its environment, registers obstacles, for example, and creates a map based on this information. The map itself can be stored in the map module 11 and can include, for example, "forbidden" areas (or areas that cannot be entered) such as manhole covers, water gutters, expansion joints, door thresholds, stairs, etc. that are to be avoided. In one aspect, a previously created map can also be transferred to the robot memory 820, for example via the cloud. In this case, no mapping by the robot would be necessary. Furthermore, the navigation module 10, for example, has a localization module 15 for self-localization, preferably within a mapped environment. The robot can have a path planning module 13 for metric path planning, which ensures that robot 1 can efficiently calculate its own path, e.g. by optimizing various criteria to find an optimal path. In one aspect, a motion planner 16 can be used to calculate an optimal path for the robot based on the results of the (metric) path planning from the path planning module 13 under consideration or optimization of different cost functions. The cost functions are the data from the path planning, e.g. obstacle avoidance, preferred direction of travel, etc. Here, for example, the Dynamic Window Approach can be used. An energy monitoring module 19 for automatic charging ensures, for example, that robot 1 automatically visits a charging station when the energy level is low, docks there and charges its accumulator 825.

The robot 1 can also have a self-blockage detection module 14 at this level, which enables the robot 1 to move away from a stop position in the event of a blockage caused by fixed or moving obstacles that have led to a stop in the robot's movements in a stop position and, for example, to continue executing its job. Furthermore, the robot 1 can have a localization module 15 which helps the robot 1 to determine its position on a map contained in navigation module 10 (see map module 11) by scanning its surroundings using the existing sensor technology. An optional waiting position determination module 17 contains rules according to which robot 1 takes up a waiting position during a job and/or between different jobs. These rules will be further explained below.

In one aspect, the robot 1 has a person recognition module 20, a person identification module 21 for person identification, a visual person tracking module 22 for visual person tracking primarily via a camera, an optional laser-based person tracking module 23 for LIDAR-based person tracking. In addition, there is, for example, a skeleton model creation module 24 for skeleton model creation. This skeleton model creation module 24 can create a skeleton model based on data acquired by a camera 35, as described in more detail below. The person identification in the person identification module 21 can be done by means of skeleton model creation, as it is possible with evaluation frameworks of 2D and 3D cameras and/or frameworks like OpenCV, OpenPose, etc. A synchronization of the recordings of the sensors, which implement the skeleton model creation, and an RGB recording allows to assign colors and/or color patterns and/or textures of clothing to body regions of the tracked person, which e.g. come from the person's clothing. Based on the parameters color and/or color patterns per body region and/or size parameters of the patient (body height, arm length, leg length), persons can be tracked over time and also be recognized. Alternatively and/or in addition, gait patterns and/or face recognition known from the prior art can be used.

Various components are implemented on hardware level 30. Among them is an odometry module 31, i.e. a measuring and control unit for the odometry function, which is connected to the navigation module 10 via an interface. Pressure-sensitive bumpers 32 (or combined rubber-buffered safety edges with impact protection) are located at a distance of preferably more than 10 millimeters above the ground and allow collision detection. Alternatively and/or in addition, ToF sensors 33 and/or so-called close-range LIDAR/radar/ultrasound sensors can also be used as distance sensors. If a collision is detected, an immediate stop of the differential drive 40 is triggered. This differential drive 40 otherwise ensures the general locomotion of robot 1. A charging port with the associated charging electronics 41 makes it possible to recharge the integrated accumulator 825 and to be supplied with appropriate energy from an external charging device. The motor control 44 can be part of the (robot) control 41 in one aspect and can contain e.g. the inertial sensor 45.

FIG. 2 shows a different view of the robot 1 in an exemplary configuration. The robot 1 has wheels 805, a LIDAR 34 and a camera 35, which are used together for navigation purposes. The robot 1 has an environment perception sensor 46, which can include camera 35 or LIDAR 34, but also other sensors for non-contact environment detection such as radar, ultrasonic or infrared sensors. The controller 41 of robot 1 has a processor 830 and a memory 835. The robot 1 also has a robot computer 810 with a robot processing unit 815 and a robot memory 820. The robot 1 is connected via a wireless interface 38 to a cloud server 850, which has a cloud processing unit 855 and a cloud memory 860. The software modules described and the rules described below can be stored in the robot memory 820 or, if applicable, also in the cloud memory 860, provided that the robot 1 has an online connection to it via an interface (e.g. 38).

The procedure for positioning a robot 1 in front of elevator 700 is now described in FIG. 3. In step 105 the robot 1 receives an order which is connected to a certain geographical position. In one aspect, the geographical position can be represented by three-dimensional coordinates, whereby the height dimension contains information about the floor on which the job is to be carried out. Alternatively and/or in addition the order is associated with separate information about the floor. This order can either reach the robot 1 via wireless interface 38 or be stored in the robot memory 820. The order can be either of a one-off nature or, in certain periods, recurring. The geographical position can be a fixed coordinate or an area described by several coordinates (e.g. in such a way that the job is to be executed between two coordinates on one level). As mentioned above, the robot 1 has a navigation module 10, which has maps of the environment (for example, inside the map module 11) in which the robot moves. This navigation module 10 can be updated, in an executable form, through a cloud application, where the cloud processing unit 850 or from the cloud memory 860, for example, a map is transferred to the robot memory 820 (see FIG. 2), where the map is stored in the navigation module 10. In another version, this navigation module 10 is located in the cloud and the robot 1 can access it in real-time via wireless interface 38. In this case, for example, the navigation module 10 would be located in the cloud memory 860 (see FIG. 2).

The following calculation steps concerning the navigation of robot 1 are executed in navigation module 10, for example. The robot 1 compares the floor of the target position resulting from its order with the floor of the current position in step 110 in the robot processing unit 815, whereby the floor of the target position is derived from the coordinates associated with the order and the current floor is derived from the self-localization module 15, for example. If the floor of the target position is identical to the floor of the current position in step 110, the robot 1 navigates to the geographical position of the target position on the map in step 115 without changing the floor. If the floors of the target position and the current position do not match, in step 120, the robot 1 checks in its robot processing unit 815 based on its current position and the map where the nearest elevator 700 is located on the floor. For example, the Euclidean distance between the coordinates of the current position 110 of the robot 1 and the coordinates of at least two elevators 700 can be determined, and then the elevator 700 can be selected whose Euclidean distance is shorter (in the case of a single elevator 700, the calculation to determine the shorter path is unnecessary, and the robot 1 can go directly to the elevator 700). The calculation of the Euclidean distance can also take into account any obstacles on the way to the elevator. The robot 1 also determines whether the robot 1 must move up or down in the elevator to reach the target position. A trip to a higher floor is necessary, for example, if the floor on which the target position is located has a higher floor number than the floor on which the robot 1 is in its current position.

Here, the robot 1 calculates the path to the elevator and/or target position in step 125 within the Motion Planner 16 based on a criteria catalog. This criteria catalog can either be stored in the navigation module 10 or in another component of the robot 1. Criteria that play a role here can be the state of the power source that supplies power to the robot 1, the urgency of the job, etc. The robot determines different paths that lead to the target position or to an intermediate target position (e.g. the elevator, if it wants to reach a target position on another floor). Based on the criteria catalog, the respective paths are weighted, considered as cost functions and the path with the lowest cost is selected. The Dynamic Window Approach mentioned above, evolutionary algorithms or other path planning methods described in the state of the art can be used. Calculation programs for the calculation of the cost function, for example from the Robotic Operating System (e.g. with the module base_local_planner), can be used for this calculation.

The robot 1 navigates in step 130 to a waiting position 800 near the elevator 700, where two optional, alternative and/or complementary approaches are possible to determine the waiting position in front of elevator 700. In the first approach, the robot 1 receives information about the position data of elevator operating components 702 and elevator display elements 701 via its navigation module 10 in step 135.

FIG. 4 a) and b) show, for example, an elevator operating component 702 and an elevator display elements 701 which are located outside the elevator 700. The elevator 700 is embedded in a wall 704. Next to an elevator door 703 on wall 704 there is an elevator operating component 702, e.g. a call button. In FIG. 4a), for example, this elevator operating component 702 may have different buttons, i.e. one for upward and one for downward travel. In FIG. 4b) only one button is available as elevator operating component 702. Here, for example, a person operating the elevator 700 must specify within the elevator 700 via the elevator operating component 702 whether the elevator 700 should travel up or down. Above the elevator door 703, there are exemplary elevator display elements 701 which in FIG. 4 a) indicate the direction of travel of the elevator 700 or in FIG. 4 b) the number of floors of the elevator 700 in which the elevator 700 is located. There may also be combinations of these elements or other elevator operating component 702 or elevator display elements 701 which have the same effect. For example, the elevator operating component 702 in FIG. 4 a) may be illuminated and indicate via the lighting that the elevator 700 has been called and that the elevator 700 will move in the desired direction, i.e. when the lower button is pressed it will move downwards. FIG. 5 shows elevator operating components 702 and elevator display elements 701 which are located inside the elevator 700. Deviating from this representation, a floor representation above the elevator door 703 may also be present, similar to the one shown in FIG. 4 b) from the outside. Alternatively, an elevator display element 701 may be installed elsewhere in the elevator 700, e.g. as a 7-segment display. In most cases when mentioning the elevator 700 that is supposed to move the robot 1 from floor to floor, the elevator car is meant. For reasons of simplification, however, the term elevator 700 is mainly used in this document.

In FIG. 5 a) a person can directly select the number of floors. In FIGS. 5 b) and 9 c) it is shown that the elevator operating component 702 can also directly indicate the floor on which the elevator 700 is moving, which also means that the elevator operating component 702 can light up, for example, and thus also indicate the floor on which the elevator 700 is moving, which also means that the elevator display components 702 are elevator display elements 701.

In step 145, the robot 1 receives data on the room layout before the elevator 700 from the map module 11.

In the alternative and/or supplementary approach, the sensor system of the robot 1 scans the walls around the elevator 700 in step 140 (see e.g. FIG. 4) to identify elevator operating components 702 or elevator display elements 701. In a first step, this identification is done by recording the environment of the robot 1 with a camera 35, e.g. an RGB camera. Depending on the angle of the camera 35, the robot 1 keeps a minimum distance or moves in such a way that the sides of the elevator and/or the area above the elevator door are captured by the camera 35. The images (pictures) are stored in the robot memory 820 and are evaluated as described in the explanations to FIG. 6 below. Patterns in the stored images are compared with patterns stored in the robot memory 820, e.g. on the basis of a classification. The elevator operating components 702 (and e.g. the elevator display elements 701 described elsewhere) are assigned spatial coordinates, e.g. by evaluating the position in the recorded image, the angle of the camera 35 and the position including the spatial orientation of the robot 1 and/or the recording camera 35. If an RGB-D camera is used, however, a simplified determination of the spatial coordinates of the elevator operating components 702 and elevator display elements 701 is possible. In an alternative aspect, the robot 1 can also recognize and evaluate columns on which at least one elevator operating component 702 and, if necessary, also an elevator display element 701 is located. For example, the camera 35 continuously takes images of the areas where the elevator operating component 702 or an elevator display element 701 is located, i.e. the areas next to and above the elevator door 703, which are stored in the robot memory 820 as areas to be scanned. (If the robot 1 is located inside an elevator 700 (which is especially the case in steps described below), areas on the walls and e.g. above the elevator door 703 are scanned). Furthermore, in step 150, the robot 1 scans the environment around elevator 700 to identify the room layout with its environment perception sensor 46, in one aspect of LIDAR 34, in an alternative and/or complementary aspect a camera 35, e.g. an RGB-D camera. Starting from the position of the robot 1, which is determined e.g. by the odometry module 31, robot 1 determines the distance to objects e.g. by means of LIDAR 34. Such objects, e.g. walls, are recognized as such if the objects do not move for a defined period of time. In contrast to this, the robot 1 recognizes moving obstacles by the fact that these recognized obstacles are no longer present after a certain period of time, whereby these recognized obstacles are classified as moving. For this purpose, methods from the prior art are used for the creation of occupancy grid maps. For this evaluation the robot 1 can perform movements, also depending on the detection angle of the used sensor technology, that allow the robot 1 to e.g. maximize the detection area in front of the elevator 700 over time. In an alternative or complementary aspect, at least one radar or ultrasonic sensor can be used to detect the objects or obstacles. Based on this information about the objects or the obstacles, the robot 1 estimates in step 155 in the area in front of the elevator 700 such areas where a higher passenger traffic is expected than in other areas. These areas with presumably higher passenger traffic are characterized, for example, by the fact that in these areas moving obstacles are detected with a frequency that is higher than in other areas. Here, for example, threshold values for an obstacle detection can also be used to classify the areas according to the frequency of occurrence of obstacles. In the course of time the robot 1 can evaluate e.g. waiting positions in such a way that such areas, in which the probability of occurrence of waiting persons lies above a threshold value, are excluded as waiting areas in the map of the robot 1. The probability is determined by the detection of the person positions over time. This determination is explained in more detail in the example below.

Alternatively and/or in addition, historical data from the robot memory 820 can also be used, recorded by observations of the passenger traffic in the area in front of elevator 700 (step 160), which in one aspect may have been done by the robot 1 during previous stays in this area. Alternatively and in addition, this information may have been collected by other robots or other systems. For example, this information is kept available in the robot memory 820. People traffic is understood to be areas where people primarily move and thus indirectly also areas with little people traffic. A more detailed description can be found in example 1.

Alternatively and/or in addition to steps 135-160, fixed areas stored in navigation module 10 of the robot 1 can also be selected. These stored areas can, for example, have been previously selected on the basis of the criteria mentioned. The areas can also result from a learning behavior of the robot 1. More details can be found in example 3.

In the next step, the robot 1 scans its environment, e.g. by means of LIDAR, camera 35, radar and/or ultrasonic sensor, in this case the area in front of the elevator 700 and identifies the position of persons 165, e.g. those persons who are in waiting position. This identification is done e.g. by detecting moving obstacles identified by LIDAR 34; by persons identified by evaluating the camera images (e.g. by including skeleton model detections by means of the skeleton model creation module 24, which can be based on camera SDKs, frameworks like OpenPose, OpenCV, which offer this functionality, etc.). These areas are excluded as possible waiting areas for robot 1. In an optional aspect the robot 1, based on the layout of the area and the identified positions of the persons, determines other areas with low probability of passenger traffic in the determination step 170 and moves in step 175 optionally in the other area with a low or the lowest probability of passenger traffic at a defined distance to the elevator. In the determination step 170 the robot 1 can compare the areas identified in step 160 as areas with little passenger traffic with the areas where persons are located (step 165). Thereby the robot 1 positions itself in the areas with little passenger traffic, in which there is no person at that time.

As FIG. 6 further shows, a camera 35, e.g. an RGB camera, records the environment of the robot 1 in step 205 to identify and also classify the elevator operating component 702 and elevator display elements 701 in step 210, which is realized by an image recognition procedure. In one aspect, in step 215, the robot 1 accesses a classification database stored in the robot memory 820 or in the cloud memory 860, which is connected to the robot 1 via a wireless interface 38. This classification database contains, based on an evaluation of images of a multitude of elevator systems, classification algorithms which have been created, for example, by means of machine learning methods and/or neural networks, whereby deterministic rules can also be used in one aspect to identify these features.

These methods allow, for example, to generate color (e.g., based on an evaluation of different color channels with 8 bit), grayscales and/or textures, possibly in combination with histogram of gradient data, etc. These data are used as input data for the classification procedures, while e.g. images designated by human evaluators are used as output data. This means that an image whose data such as color, grayscale, etc. are available as input data (e.g. in the form of a table, where the data represent columns) is also assigned a value as output data, such as a code, whether it is an elevator display element 701 or an elevator operating component 702. In a further step, e.g., the interpretation of the displayed values can be performed, especially for elevator display elements 701. If such an elevator display element 701 shows e.g. the number three, which stands for floor three, a column with corresponding numerical values in the table above would describe e.g. the floor numbers mentioned on elevator display elements 701. In case of the coding as elevator display element 701, for example, a categorical coding would be done, e.g. on the level, whether it is such an element and if so, what kind of element (7-segment display, button for a certain floor, etc.). A multinomial logistic regression can be used as a classification method, which is described in more detail elsewhere in this revelation.

This not only allows to identify an elevator operating component 702 or an elevator display element 702 as such (i.e. to differentiate it from type plates), but also to interpret it, i.e. it is possible to recognize, for example, that a certain floor is displayed, that the elevator 700 has been called, that a button with an arrow pointing downwards indicates a trip to a lower floor, etc. This was already described in the previous paragraph. For this purpose, rules are stored in the classification database that assign interpretations to the actual image classifications. These rules can be created by machine learning and/or neural networks or by deterministic specifications.

In the next step 220 a tracking and an evaluation of the recordings takes place, i.e. the robot 1 is able to detect and monitor the elevator control component 702 to the extent that e.g. in case the robot 1 wants to change to a lower floor (as e.g. resulting from step 110) at least one elevator control component 702 is detected, identified and monitored for trips to a lower floor after step 220. This can mean, on the one hand, to detect and monitor the operation by a person who triggers this elevator operating component 702, but on the other hand, to detect whether this elevator operating component 702 has already been triggered because the elevator operating component 702 is illuminated, for example, which the elevator operating component 702 does not do in the non-triggered state, for example. The robot 1 is capable of interpreting the elevator control 702 to determine whether the elevator 700 should move up or down.

This interpretation is implemented, for example, in such a way that the robot 1, based on the evaluation that the robot 1 should move to a higher floor (e.g. from floor 3 to floor 5), recognizes the selection of a floor above 3 (ideally 5) by activation of the elevator operating component 702. This is done, for example, by a) capturing its environment by a camera 35, b) storing the recorded images in the robot memory 820, c) comparing the recorded patterns with patterns stored in the robot memory 820, and thus d) identifying the elevator operating elements 702, e) assigning a spatial coordinate to the elevator operating elements 702, for example, based on the evaluation of data from the camera 35 (e.g. a RGB-D camera), in particular the distances and orientation in comparison to the position and orientation of the robot 1 (e.g. derived from the odometry unit 31), f) capturing at least one person, for example, with the camera 35; g) the creation of a skeleton model of the at least one person, h) the evaluation of the position of the wrists and/or fingers of the at least one person in the course of time, i) the determination of the distance between the coordinates assigned to the fingers and/or wrist and the coordinates of the elevator operating component 702, wherein j) an activation is detected when the value falls below a threshold value. Alternatively and/or in addition, the robot 1 can interpret the elevator operating element 701, which indicates the direction of travel of elevator 700, accordingly. For example, arrow symbols in the elevator 700 can be evaluated here to determine whether these arrow symbols are illuminated, whereby the illumination and/or display of the arrow symbol pointing upwards is interpreted as an upward movement. Alternatively and/or additionally, the lighting and/or display of floor numbers can be evaluated with respect to their sequence, whereby an ascending row (e.g. 4 followed by 3) indicates an upward movement.

This results in at least two activity paths for the robot 1. The first activity path considered here implies that the corresponding elevator operating component 702 has not yet been pressed, so that the elevator 700 is unlikely to actually stop within a few minutes and continue moving in the direction desired by the robot 1. In an optional step (step 225), the robot 1 identifies persons in the vicinity of the elevator 700, e.g. at least one person who is closest to the robot 1, alternatively also one person who is closest to the elevator operating component 702. The identification of a person is based, for example, on the evaluation of camera recordings in connection with the creation of skeleton models, which identify an object as a person and assign coordinates in space, e.g. by evaluating the detection direction and the detection distance compared to the position of the robot. If several persons are identified, the distance of the positions of the persons in space to the detected and identified elevator operating components 702 can be determined. The robot 1 optionally aligns itself towards this person in step 230. In a further step the robot 1 addresses this person, i.e. initiates an output via its display 37 and/or a speech synthesis (via its loudspeaker 42), which includes a corresponding request to press the corresponding button (i.e. an elevator operating component 702) in step 235. The output contains information about the desired destination floor in one aspect. In an alternative and/or supplementary aspect, the output contains information about whether the floor is above or below the position of the robot 1.

The step 225 is implemented in the person recognition module 20, for example, which automatically creates skeleton models of persons present in the camera image (e.g. in the OpenCV framework), determines the coordinates of the person in the robot environment from the 3D data (e.g. the position of the person in the robot environment), and creates the skeleton model from the data. The coordinates of the person in the robot environment are determined from the data (e.g. alternatively via the position of robot 1), and the coordinates of the person are used to evaluate the Euclidean distance of the person to the elevator operating element 702 and/or robot 1 and, for example, in the case of several persons, to compare them. The orientation of the robot 1 towards the person in step 230 can, for example, be carried out in such a way that the robot 1 first determines the orientation of the person on the basis of the skeleton model parameters, whereby the robot 1 determines the direction of rotation via the axis between two shoulder joint or hip joint points and the front or back, for example, on the basis of a face recognition described in the prior art. In a further step, the robot 1 positions itself in front of this person in such a way that, for example, its front side deviates from the sagittal plane of the person by an angle of less than ±120°, for example less than ±60°. This allows the person to better recognize an output on the display of the robot 1, for example. In general, however, it can be assumed that a person is more likely to feel addressed at such an angle than if the person is addressed from behind. In step 240, the robot 1 monitors the behavior of the addressed person to check whether this person presses the button (i.e. the elevator operation component 702). If such pressing is detected, steps 205 forth following are repeated again.

For the detection of the pushing movement, the robot 1 detects the elevator operating component 702, i.e. an elevator operating component 702 that calls the elevator 700, and the robot 1 tracks (after the skeleton model is created with the skeleton model creation module 24, possibly supported by the visual person tracking module 22), the movements of the person, in particular the movements of the detected finger limbs, alternatively those of the wrist point from the skeleton model, and determines their distance to the elevator operating component 702. If this distance falls below a threshold value, it is assumed that the elevator operating component 702 is pressed. In a control step, it is also possible to switch to a change of color of the elevator operating component 702 (e.g. light up after falling below the threshold value) or to a change of display in the elevator display elements 701, or combinations thereof.

Alternatively, the optional step 245 is possible. If, on the other hand, no push motion is detected, the robot 1 addresses the person again, alternatively it addresses another person who is near the elevator door 703 (step 270). The robot 1 can also repeat this response several times. After each of these addresses, step 205 follows. It goes without saying that if there is no person who can be addressed by the robot 1, the robot 1 will wait until a person is identified by the robot 1 or until an elevator door 703 opens. Regarding the method of person identification, please refer to e.g. the previous paragraph.

If the evaluation of the elevator operating components 702 shows that the elevator 700 is approaching, the robot 1 will (identify and) monitor the elevator door 703 in an optional step 245. In an optional aspect, the robot 1 will identify persons leaving the elevator 700 in step 250 and also optionally the persons entering the elevator 700 in step 255. In step 260, the robot 1 determines the required space in the elevator 700, for which purpose the robot 1 uses its sensor technology, particularly the environment perception sensor 46 (e.g. a 35 camera or a LIDAR 34, with ultrasound and radar as possible alternatives) and calculates the area in the xy-plane on which there is no obstacle. In the first step, the robot 1 determines the free area, which is derived, for example, from the occupancy grid map inside the elevator 700, which the robot 1 creates using its sensors (a standard procedure in robotics). In the second step, the dimensions of this area are compared with the information about the area stored in the robot memory 820, which reflects the area dimensions of the robot 1 plus a usual safety distance to obstacles. The robot 1 optionally also includes the area of an empty elevator 700, which the robot 1 may have stored as a "historical" value by previous area determinations and/or which is permanently stored as a value in the memory of the robot 1 (step 265). An empty elevator 700 is identified, for example, in such a way that the robot 1 recognizes a mainly rectangular area within the elevator 700. The recognition of a rectangular area can be done on the basis of an occupancy grid map. As shown in FIG. 7, this map shows occupied cells (dark in FIG. 7) and free cells (light in FIG. 7). Direction vectors are created along occupied cells that border on unoccupied cells. The angle of the direction vectors is evaluated. In FIG. 7 *a*) and b) the angle is 90°, i.e. it is essentially a rectangular shape (of which one corner is shown here). In FIG. 7 *c*) the angle deviates from 90°, i.e. it is not a rectangle. This case is excluded, i.e. it is assumed that there is no empty elevator. Furthermore, the length of the direction vectors is determined. If the length of the direction vectors is below a threshold value, these cases are also excluded (see e.g. FIG. 7 *d*). In one aspect, a chain of direction vectors can also be considered, where the parallelism of the direction vectors is evaluated, where the orientation of the direction vectors is evaluated over a defined total length, and if the direction vectors are predominantly parallel, this case is classified as an empty elevator. However, in this case the direction vectors, which are approximately parallel, must be orthogonal to each other. This case is shown e.g. in FIG. 7 *d*), where the "unevenness" of the detected walls (i.e. the dark areas) is ignored, because the orientation of the vectors of each side is essentially parallel. Additionally, the length or total length of several direction vectors can be evaluated.

The robot 1 can also take measurements over time and store the maximum of the determined area as that of an empty elevator 700. In the case of the determination of the area of the empty elevator 700, the robot 1 evaluates e.g. the number of free cells that it determines within the elevator 700, stores this number of free cells of the occupancy map in its robot memory 820 (where the number of free cells is e.g. proportional to the area) and repeats this process over a certain number (e.g. 20) of operations where the robot 1 enters the elevator 700. Then the robot 1 determines the maximum over the stored number of free cells of the occupancy grid map and, by multiplying this value by a value stored in the robot memory 820, which represents the size of one cell, the robot 1 determines the size of the area of the empty elevator 700. In one aspect, the robot 1 can detect if there are moving obstacles in elevator 700 when it detects the contents of elevator 700 and, if so, exclude the measured values (number of free cells of the occupancy grid map) when determining the area of the empty elevator 700.

A calculation of the free space in the elevator 700 is relatively simple if the elevator 700 is empty or people are standing at the back of the elevator wall. Usually, however, people are distributed in the elevator 700, although people could be standing closer together. To account for this standing together, the procedure for determining the free space is shown in FIG. 8. The maxim here is that the free space inside the elevator 700 must be larger than the floor space of the robot 1 (step 305), although the area that the robot 1 ultimately requires (i.e. the floor space) (step 310) may be slightly larger to allow movement inside the elevator 700 while still maintaining a safe distance to people. Such information is stored in the robot memory 820, it is added to the area covered by the robot 1 in step 305, for example, i.e. the dimensions of the robot 1 are provided with an additional value (allowance) that is stored in the robot memory 820. In addition or alternatively, the stored area of robot 1 is stored in robot memory 820 in a slightly larger size.

After opening the elevator door 703, the interior of the elevator 700 is scanned and the robot 1 determines the free space in elevator 700, e.g. based on the occupancy grid map already described. This area is compared with the area required by the robot 1 (step 310) described above. The shape of the area is also taken into account, i.e. the length and width of the unoccupied area is compared with the length and width of robot 1 (plus the allowance). If the floor space of the robot 1 is larger than the free area, the robot determines the number of people in the elevator in step 315. Thereby the robot 1 uses at least one environment perception sensor 46. In one aspect this can be realized by a skeleton model creation, where appropriate frameworks are used, e.g. with a camera 35, and the number of captured skeleton models is added. In one aspect, if the robot 1 detects in step 305 that there is not enough space in elevator 700, the robot 1 takes a new position in front of or in the elevator 700 in step 312, in order to be able to better estimate, by changing position within the elevator 700, whether there may be more people behind people standing in front. The change of position has the effect that a different detection angle of the at least one environment perception sensor 46 makes it easier to detect persons behind other persons. Persons can be determined e.g. by the skeletal models created with a camera 35 (2D or 3D), in the context of a LIDAR acquisition based on the shape of the legs (approximately round, diameter larger than 5 cm and two per person). The robot 1 adds the captured persons to the number of persons in the elevator 700.

Then, in step 320, the robot 1 multiplies the number of people in the elevator 700 by an average value that represents the required area in the elevator 700 per person and calculates in step 330 whether this area is larger than the area required by the robot 1 inside the elevator 700 (i.e. at least larger than the floor space of the robot 1). If the area available after this calculation is not sufficient, the robot 1 jumps back to step 205. If the area is sufficient, the robot 1 navigates in one aspect towards the elevator door 703 in step 335 (to signal that the robot 1 wants to use the elevator 700). Alternatively and/or in addition, in step 340 the robot 1 signals via speech synthesis and/or display that the people inside the elevator 700 may move closer together. After steps 335 and 340, the robot 1 calculates the free area again and jumps back to step 305, but waits a few seconds in step 350 before the next area calculation. If the robot 1 has completed steps 335 and/or 340 in one more pass, the robot 1 jumps back to step 205 in FIG. 6, which in the end means that the robot 1 is waiting for the next elevator 700.

If, on the other hand, the robot 1 has calculated after step 305 that the area inside the elevator 700 is sufficiently large (i.e. larger than the floor space of the robot 1), the robot 1 enters the elevator 700 in step 325 and scans the environment in step 355 to detect an elevator operating component 702. This detection of the environment may also include rotations of the robot 1. Normally, the position where the elevator operating components 702 are located inside the elevator 700 is stored in the robot memory 820, which simplifies their identification. The robot 1 uses the method already outlined elsewhere in this document. In step 327, for example, the robot 1 positions itself in the elevator 700 in such a way that the robot 1 can detect from its position both the elevator operating components 702, the floor display (if present) as an elevator display element 701, and the elevator door 703 by means of its sensor system, whereby this detection can also occur sequentially within a defined time interval depending on the arrangement of these elements/ components.

If the elevator operating components 702 are recognizable, the robot 1 checks in step 360 whether the desired number of floors has already been selected (including steps 205-215). If yes, the further procedure in FIG. 9 continues with the floor determination in the elevator 700. If the elevator operating components 702 are not recognizable for the robot 1, the robot 1 requests in step 365 an output via the display and/or loudspeaker to passengers travelling with it to select the desired floor. In an optional aspect, the robot 1 detects the behavior of persons in the vicinity of the elevator operating components 702, i.e. the robot 1 detects in step 370 whether these persons have moved ("Tracking of persons near buttons"). This can be done by detecting a change in the position of at least one of the limbs (e.g. a leg) of the persons detected by the environment perception sensor 46. Alternatively and/or additionally, an evaluation of the occupancy grid maps can be performed to determine whether the occupancy of field changes. Alternatively and/or supplementally, an evaluation of the skeleton points can also be carried out from a skeleton model acquired and calculated on the basis of at least one camera 35, in which the change in position of skeleton model points and/or the angle of direction vectors connecting joint points is used. If the robot 1 does not detect any movement, the robot 1 jumps back to step 365, alternatively it continues with the floor detection in the elevator 700 in FIG. 9.

FIG. 9 now shows the sequence in which the robot 1 determines the correct floor at which the robot 1 leaves the elevator 700. In step 410, the robot 1 scans the environment to detect the elevator operating components 702 (steps 205-215) and/or elevator display elements 701. If the elevator display elements 701 are recognizable, the robot 1 classifies the floor numbers output by the elevator display element 701 by means of established image classification methods, e.g. by taking an image and comparing the taken image with patterns, determines the floor number (e.g. 3) and, in step 425, compares this output floor number with the floor number (e.g. 5) in which the robot 1 has to leave the elevator 700. If the floor numbers of the selected floor match the target floor, the robot 1 leaves the elevator 700 when it stops at the floor, otherwise the robot 1 remains in the elevator 700 (see below).

If, on the other hand, the elevator operating components 702 and/or the elevator display elements 701 cannot be recognized, in step 420 the robot 1 requests by means of the display 37 and/or speech synthesis (output via loudspeaker 42) that bystanders call the attention of the robot 1 to the correct floor. In step 430, the reaction of the bystanders can again take place via the display 37 of the robot 1 (e.g. in the form of pressing a menu button), on the basis of other input units (e.g. in the form of a physical button), and/or in the form of spoken language (which is recorded by at least one microphone 43 of the robot 1 and evaluated by means of established methods of speech recognition).

When the floor is reached, in step 435, the robot 1 can signal to bystanders in an optional aspect that the robot 1 wants to leave the elevator 700. This signaling can be done by signal lamps, by (slow) movements towards the elevator door 703, by voice output, by a warning tone, by indications on the display 37, or even combinations of these means. The robot 1 monitors the elevator door 703 in step 440 with its environment perception sensor 46. This monitoring is done, for example, by means of the LIDAR 34, which can determine whether the area of the elevator door 703 is open (e.g., by detecting whether the fields where the elevator door 703 is located (stored in memory) are free on the occupancy grid map) or closed (obstacle detection where the elevator door 703 is located according to data stored in the robot memory 820). As soon as this elevator door 703 opens, the robot 1 on the target floor leaves the elevator 700 in step 445 and moves to its target position on this floor 450. Of course, the robot 1 checks the area in the direction of travel with regard to persons who are located there and observes defined safety distances and measures, i.e, if they do not follow the optional request in step 435 to step aside, the robot 1 remains in the elevator 700 until the robot 1 reaches the target floors again, in which case the robot 1 would jump to step 410. The robot 1 maintains the safety distances by only moving in one direction if no obstacle within a defined area can be detected by its sensors in this direction (e.g. by means of LIDAR data in the occupancy maps of the robot 1). The width of that defined area depends on the width of the robot 1, the depth of the defined area depends on the speed of the robot 1. If the depth is e.g. 25 cm, the robot 1 can move slowly in this direction. If the depth is 2 m, the robot 1 can move there at a higher speed. If the depth is only 10 cm, for example, the robot 1 will stop and not move out of the elevator 700.

Example 1: Identification of a Waiting Position of the Robot in Front of the Elevator The robot 1 uses at least one of the following three criteria to identify a waiting position in front of elevator 700. One criterion is the minimization of traffic flow disturbance. Another, alternative or complementary criterion is the distance to the elevator door 703. The third, alternative or complementary criterion is the detection angle of the elevator interior after opening the elevator door 703 (based on the position of the robot 1), which should be selected so that the robot 1 can scan as much of the area of the interior of the elevator 700 as possible when the door is opened. These criteria are explained in detail below.

FIG. 10 shows an example of how areas with little passenger traffic can be derived. This illustration in FIG. 10 is a top view. In this example, two elevators 700a and 700b are located at a first aisle 710, which runs from left to right and whose displayed section is limited by the points I-J-H-G. This aisle 710 is interrupted by a much wider aisle 715 at points A-B and C-D, which shows the two elevators 700a, 700b on one side and whose depiction ends at points K-L. On the wall 720 between the elevators (E-F) 700a, 700b is the elevator operating component 702 (here: button) for the elevators 700a, 700b.

Grey arrows indicate possible walking directions of people moving in the first aisle 710, in the wide aisle 715 and around the elevators 700a, 700b. For example, the first aisle 710 has a width of e.g. 2 m (measured between points A-B), the wide aisle 715 has a diameter of e.g. 6 m (measured between points B-C). The actual direction of movement of people in the area shown depends on many factors, including oncoming traffic, the number of people moving approximately parallel, etc.

In the areas of aisle 710, 715 E-C-H-G and I-J-B-A only one direction of travel was shown towards elevator 700a or 700b. Of course, people can also walk in opposite directions (just as people can leave the elevator 700a, 700b, although the arrows in the illustration only point in the direction of the elevator). In general, the movements are more in the middle of the elevator. In front of elevator 700a, 700b, the movements depend on whether the elevator doors 703 are open or whether elevator 700a, 700b still needs to be called.

The illustration in FIG. 10 also shows two possible positions of the robot 1, which is noted as robot position 750. In one aspect, the robot 1 has positioned itself near point B.

At this first position (robot position 750*a*), the robot 1 is visible from all aisles 710, 715, but keeps relatively close to the wall because there is less probability of people moving directly along it. Instead, the robot 1 assumes that the traffic of people will stay rather in the middle of the aisles and will pass the robot 1 in the area C-D-E-F-A-robot. In the second robot position 750*b* shown, the robot 1 is located in the intersection area of the first aisle 710 and the wide aisle 715 opposite points C and E. In this second robot position 750*b*, it is assumed that passenger traffic that walks along the first aisle 710 will pass through the area D-E-F-A-robot, while passenger traffic that wants to pass through the wide aisle 715 and either comes from the elevators 700*a*, 700*b* or the aisle will pass through the areas between the robot 1 and C or between robot 1 and B. In both cases, the robot 1 has not been positioned in the middle of the aisle, nor at a distance from elevator 700, for example less than 50 cm.

Both robot positions 750*a*, 750*b* have in common that the distance to the elevator 700*a*, 700*b* is not so large that an impairment of the direction of movement of the persons is to be expected, which would be the case, for example, if the robot 1 was located at a distance of approx. 50 cm in front of the elevator door 703. For example the distance to the elevator 700*a*, 700*b* is at least 90 cm, better 1 m. Furthermore the shown robot positions 750*a*, 750*b* ensure that the traffic flows along the center line of the aisles do not mean significant detours through the robot position 750*a*, 750*b* of the robot 1, where significant detours mean distances of more than e.g. 2 m. Similarly, the robot 1 does not position itself directly in front of elevator operating component 702 so as not to prevent people from operating the elevator 700. In summary, the minimization of traffic flow disturbance is a first criterion.

There are now several possibilities to implement this criterion of traffic flow disturbance in the robot 1, which e.g. can be combined (completely or partially). One possibility is to store a map in the map module 11, in which waiting positions are fixed. This also applies, for example, to the other two criteria distance to the elevator door 703 and detection angle elevator content. Another possibility is the recording and evaluation of passenger flows, which is explained in more detail in one of the following examples. A third possibility is to define waiting positions based on the restrictions described in the previous paragraphs. This includes, for example, that the robot 1, in order to find a waiting position where the robot 1 should disturb the traffic flow as little as possible, searches for robot position 750, which is located near a wall, which is e.g. shown in the occupancy grid map. If the robot 1 positions itself e.g. at a corner in the room as robot position 750 (e.g. at point B in FIG. 10), the robot 1 positions itself e.g. in such a way that it is visible from both aisles, i.e. it extends at least partially into the aisle that lies between points A and B.

As of a defined aisle width, the robot 1 can also be positioned away from the wall in the direction of the middle of the aisle as an alternative to this robot position 750 on the wall, whereby the robot position 750 depends on the aisle width and the width of robot 1. In one aspect the robot width can be 80 cm and the aisle width 4 m. In this case, the robot 1 can be located e.g. 1.2 m away from the wall towards the center of the aisle (while on the other side of the robot 1 the wall is e.g. 2 m away). Alternatively and/or in addition, the robot 1 can maintain defined minimum distances to elevator operating components 702, e.g. 70 cm or more.

In an alternative and/or complementary aspect, the robot 1 is positioned near the elevator, not centrally in front of elevator doors 703, but laterally offset. In the case of two or more elevator doors 703 next to each other, the robot 1 positions itself, for example, between two elevator doors 703, but not necessarily centrally between the elevator doors 703.

Two further criteria determine the robot positions 750*a*, 750*b* of the robot 1. On the one hand, it is the distance to the elevator door 703. This distance must not be too large, so that on the one hand the sensors of robot 1 can scan the elevator contents when the elevator door 703 opens. On the other hand, after the elevator door 703 has opened, the robot 1 navigates towards the elevator door 703. If the robot 1 takes into account the typical walking speed of a human being of 1 m/s, the robot 1 alone (without considering acceleration and deceleration) would need about 3 seconds at a distance as shown in FIG. 10. Thus, the waiting interval of the elevator door 703 (elevator door completely opened or last person passed until the door closing movement starts) must be more than 3 s. The robot 1 can either learn and store such values by observing the elevator 700 (see example 3) or these values can already be stored in the robot memory 820. For the navigation of the robot 1, it is more important to be able to use the elevator 700 than to grant persons in front of the elevator 700 a large freedom of movement. Therefore, the second criterion distance to the elevator 700 is more important than the first criterion with a robot position 750, which allows very large freedom of movement for traffic flows. The distance to the elevator door 703 is thus determined, for example, by the average speed of the robot 1 in front of an elevator 700 and the time interval during which the elevator door 703 is open. If the robot 1 is between the elevator doors 703, a light barrier prevents the closing of the elevator door 703, for example, which enables the robot 1 to reduce its speed afterwards.

The third criterion is aimed at ensuring that the robot 1 can detect most of the interior of the elevator 700 after the elevator doors 703 were opened. In this case, 'most of' means that the robot 1 can detect at least 80%, better at least 95% of the elevator 700 or, for example, only the back wall of the elevator 700 if there are no people in the elevator 700. By placing the robot 1 in such a position, the robot 1 can also, as described elsewhere, easily detect the number of people inside the elevator 700. This ensures that the robot 1 can scan most of the interior of the elevator 700 to calculate whether there is enough space for the robot 1.

This criterion is implemented, for example, in the context of mapping, which can be performed by the robot 1. Here, the robot 1 can capture the area of the elevator 700, for example, by scanning the elevator 700 by positioning itself in front of or better inside the elevator 700, e.g., using the LIDAR 34, and compute the elevator area from the measured distances to the detected elevator walls. If the robot 1 is then located outside the elevator 700, but positioned in such a way that the robot 1 can detect the area of elevator door 703 by means of its sensors, the robot 1 scans the area that the robot 1 can reach above it after opening elevator door 703. By changing position, the robot 1 scans the area from different positions. The area detected inside the elevator 700 is stored in the robot memory 820 together with the robot position 750 from which this area was determined. The determined areas are then compared with each other and the position from which the maximum area within the elevator 700 could be computed is selected.

It can be seen in FIG. 10 that this detection is only limitedly realizable in the left robot position 750*b* of the robot 1 because the upper right corner of 700*a* cannot be detected by the robot 1 and therefore this robot position 750*b* is only limitedly suitable. The positioning of the robot 1 is therefore carried out under the consideration that 1) the robot 1 takes into account passenger traffic flows and minimizes its influence on their flow, 2) the robot 1 is positioned close enough to the elevator 700 to be able to reach the elevator doors 703 after opening of the elevator doors 703, better after entry/exit of a person, before these doors close, taking into account the speed of the robot 1, and 3) the robot 1 is positioned at an angle to the elevator 700 that allows the robot 1 to sufficiently detect the rear wall after opening.

If more than one of the criteria is used, then these criteria can be evaluated weighted together, e.g. via an objective function, whereby the criterion distance to the elevator door 703 is weighted the highest. The robot 1 can, for example, determine different robot positions 750 per criterion that come into question and then select the robot position 750 that maximizes the objective function. A further criterion is, for example, the detection range of the optical sensor for detecting the elevator contents, which is limited, but should nevertheless detect at least the back of the elevator 700 from the position of the robot 1.

Example 2: Learning Behavior of the Robot for Positioning in Front of an Elevator The robot 1 is configured in such a way that the robot 1 can use its sensors (like the at least one environment perception sensor 46) to detect the elevator doors 703 in closed and open state. This is done in one aspect with the help of the maps that are stored in the map module 11 and, in one aspect, that the robot 1 has created itself from the environment of the elevator 700. The one or more maps also include the elevator 700 when the elevator doors 703 are open. The sensors are e.g. 3D sensors such as an RGB-D camera or a LIDAR 34, alternatively an RGB camera. The robot 1 identifies the areas of the elevator doors 703 due to their changing permeability (e.g. because within the occupancy grid maps these fields are sometimes completely occupied, sometimes not), records these areas over time and thus determines over a longer period of time how long the elevator doors 703 are open. The robot 1 also includes an aspect of whether there are people in front of the elevator 700 and/or inside the elevator 700 (as described in more detail above), which may influence the opening times of the elevator door 703 and may also depend on the respective elevator controller. The robot 1 can use machine learning and/or neural networks for this purpose. The output variable is the opening time (i.e., the time during which the elevator door 703 is open) and the input variable for the computations is, for example, the number of persons in front of and/or inside the elevator 700, which the robot 1 identifies and evaluates accordingly. The result is a table with the number of persons in one column, the corresponding opening time of the elevator door 703 in another column, and, if necessary, other variables as mentioned in the following paragraph.

In one aspect, the evaluation can be a linear regression in which several independent variables x1, x2, . . . as input variables and the dependent variable y from the output variable: y=b0+b1*x1+b2x2+b3*x3+ . . . . . . bn*xn, which are estimated according to the least squares method, where b represents the regression weights. The library Scikit-Learn for Python can be used with the function LinearRegression( ) In a simplified version, the robot 1 only determines the opening times without considering other influencing factors and calculates an average value. The opening times calculated in this way are set in relation to the speed of the robot 1 in the robot computer 810, whereby acceleration times and deceleration times are also taken into account. That means concretely, if the door opening time for a determined scenario (e.g. two persons in front of the elevator) is three seconds, the robot 1 travels an average of approx. 0.5 m/s (taking acceleration and deceleration into account), the robot 1 must not be further away from the elevator than 1.5 m, so that the robot 1 reaches the elevator before the elevator door 703 is closed.

Example 3: Recording and Evaluation of Flows of People

The robot 1 is configured in such a way that the robot 1 is able to detect persons over time by means of its sensor technology, whereby the tracking process follows the prior art. In one aspect, this detection is first performed by creating a drawing box in each frame of a camera image for each detected object e.g. each person. The underlying object recognition, which for example is also a preliminary stage for the interpretation of elevator display elements 701 and/or elevator operating components 702, can be performed by means of color boundaries and contour extractions, hair cascades, histogram-of-gradients and linear support vector machines, recursive convolutional neural networks, etc. For each drawing box the center of the coordinates is determined (e.g. by halving the coordinate values from the drawing box edges). Each draw box gets an ID. Compared to the following frame the Euclidean distances between the centers of the coordinates are determined. It is assumed that the distance changes between the frames for the same objects are smaller than the distances between other objects. New objects are subsequently assigned new IDs. IDs of objects which do not appear anymore, e.g. ignored. This approach of a centroider tracker can be implemented for example in Python using the packages SciPy, NumPy, OpenCV. This tracking can be used to detect streams of people in the environment of the robot 1, but also waiting positions of people. A stream of people is understood to be the movement of a person near the elevator door 703, which roughly includes the environment shown by arrows in FIG. 4. Waiting positions of persons are those areas in which the detected persons stay longer than a defined period of time, e.g. 3 seconds. In order to improve the real-time capability of the evaluation, an evaluation in C++ can be used instead of Python, using appropriate software packages.

The movements or waiting positions recorded here are particularly recorded during the periods in which the robot 1 is in a waiting position in front of the elevator 700, but also when the robot 1 moves into or out of the elevator 700.

Coordinates or cells are assigned to the spatial progression of the flows of people and the waiting positions in an occupancy grid map and these coordinates or cells are stored in the robot memory 820, whereby an attribute indicates whether it is a waiting position or a flow of people. A stream of people is recognized as such, for example, when a cell in an occupancy grid map is occupied for a defined period of time and then becomes free again. This information can be supplemented by information from the evaluation of a camera 35, for example, which assigns the information person to the obstacle registered in the occupancy grid map, for example by evaluating the camera images on the basis of a skeleton model and assuming that the moving obstacle in the cell of the occupancy grid map is a person when creating a skeleton model. The data to be evaluated are available in table form, with the coordinates or cells of the occupancy grid map as one column; the times when and/or how long the coordinates or cells are occupied as another column; the information whether the occupied coordinate or cell is a person at the respective time, in another column, etc. In addition, columns for categorical data at times of day, days of the week, months, etc. can be provided to take seasonal effects into account. Based on this information, machine learning methods such as hierarchical clustering or K-means clustering are used to determine over longer periods of time those areas where the flow of people is taking place and where people are waiting. These data can be visualized e.g. via heatmaps for a user of the robot 1. For this purpose there are different functions in statistical software like e.g. the function "heatmap" in R, where the robot 1 can only take robot positions 750 based on the calculated cluster. The sensing (i.e. capturing people positions over time) can be done in the context of a mapping, which runs over several hours. However, this mapping can also be carried out in one aspect during the usual journeys of the robot 1 in operation, e.g. over half a year. The robot 1 records individual areas only briefly each time, but due to the number of trips and the duration of the time period a multitude of measured values can be determined. Here the areas are assigned probabilities for the two events flow of persons and/or waiting position.

These probabilities can in turn be used by the robot 1 to determine its own waiting positions (robot positions 750 in FIG. 11). An area that the robot 1 considers as an own waiting position has a low probability for flows of people and optionally a high probability for a waiting position of people. The probability is calculated e.g. as the determined frequency of occupancy over all recorded times (e.g. 10 min determined occupancy of the cell of the occupancy grid map by 5h recording of the cell, whereby seasonal aspects can be considered as described above). This is limited, however, in that there is sufficient space, e.g. at least 50 cm, to the elevator controls 703 to call elevator 700, so that people are able to call elevator 700.

Example 4: Learning a Waiting Position Based on the Recognizability of Persons in the Elevator The robot 1 is in a waiting position (robot position 750) in front of the elevator 700 and has the goal of changing floors using elevator 700 without undue delay. For this purpose, it is necessary to use an elevator 700 with enough space for the robot 1. The space is mainly blocked by persons (possibly also other objects like other robots) who are in elevator 700. The robot 1 can, in one aspect, navigate directly into the door area each time the elevator door 703 is opened, in order to detect how much space is in the elevator 700, i.e. to evaluate whether the robot 1 fits into the elevator 700. However, this would prevent people from getting out (and possibly also getting in), would increase the length of time the elevator 700 stays on the floor, and would thus reduce the transport capacity of the elevator 700. For this reason, the robot 1 is positioned, for example, at a sufficient distance from the elevator door 703 to give people enough space to leave (and possibly enter) the elevator 700. However, it is advantageous to record the contents of the elevator 700 in order to determine whether there is sufficient space for the robot 1 in the elevator 700. Depending on the design of the elevator 700, different numbers of people or obstacles in the elevator 700 can be detected from certain angles. The robot 1 can therefore, in one aspect, be configured so that the robot 1 automatically assumes the robot positions 750, where the robot 1 can best assess whether the robot 1 still fits into the elevator 700.

In the context of this implementation, the robot 1 stores the coordinates of the position from which the robot 1 scans the contents of the elevator 700 (and in another aspect also the environment on the floor with waiting persons). The robot 1 scans the contents of elevator 700 (possibly an empty elevator 700, an elevator 700 with people, with other obstacles, etc.), the number of people (possibly also the dimensions of objects) leaving the elevator 700, in the further aspect also the number of people entering the elevator 700. This information all serve as possible input variables for a calculation model, possibly supplemented by seasonal data as described above. For the calculations, this data is available in tabular form, e.g. in columns for each criterion. Furthermore, the robot 1 detects whether it also fitted into the elevator 700 or whether robot 1, when navigating towards the elevator 700 or even inside elevator 700, could not detect enough free space that the robot 1 could occupy to change floors with the elevator 700, so that robot 1 had to abort the elevator travel process and move to a waiting position again. The robot 1 differentiates the latter events e.g. binary, i.e. the robot 1 could travel with the elevator 700 or not. These values are also included in the table for the calculations, e.g. as a column with corresponding values, where the different events mentioned can be stored categorically, e.g. limited space in the elevator 700, etc. On the basis of these data, a model is estimated that gives probabilities that can be predicted particularly well from certain coordinates that the robot 1 can actually travel in the elevator 700 based on the captured contents of the elevator 700. For this purpose, various calculation methods can be used that originate from the field of machine learning and/or neural networks, including, for example, the logistic regression mentioned above. The result of the calculation gives coordinates that, taking into account the elevator contents, will most likely allow the robot 1 to travel with the passengers in the vicinity of the elevator 700. Further data such as seasonal effects serve as influencing and/or limiting factors.

Basis for an estimation are navigation activities of the robot 1 and stored data about successful rides of the robot 1 in the elevator 700 and unsuccessful attempts, which are recorded cumulatively over time and e.g. are available in tabular form and are evaluated in the manner described elsewhere in this revelation.

Example 5: Self-Learning of Elevator Operation

The robot 1 is configured in an aspect in such a way that the robot 1 can independently identify the elevator operating component 702 and/or the elevator display elements 701 in the vicinity of an elevator door 703 whose position is determined, for example, based on a map. In one aspect, the robot 1 can access a database at the elevator operating components 702 and the elevator display elements 701 classification rules that is stored in the robot memory 820. However, these classification rules are not necessarily deterministic in the sense that each elevator control 702 and/or each elevator display 701 is exactly stored there and the robot 1 only needs to perform a shape and/or color match to identify an elevator control 702 and/or each elevator display 701 in the environment of an elevator door 703 (or within an elevator 700). Rather, the features identified in the classification process are designed to independently recognize the elevator operating component 702 and/or each elevator display element 701 based on common features such as (Arabic) numbers, letters, keys, multi-segment displays, color changes of the keys, etc. The robot 1 is, therefore, able to evaluate events over time, which are triggered by recognized persons, such as the pressing of buttons (i.e. of elevator operating components 702), or by the elevator 700 itself, such as the opening of the elevator door 703.

In a first step, the robot 1 therefore identifies candidate regions within the elevator 700 or in its vicinity based on the common features, which most probably represent an elevator operating component 702 and/or an elevator display element 701 of the elevator 700. For this purpose, the robot 1 accesses a map stored in the robot memory 820 (e.g. in the map module 11), which contains the position of the elevator 700. As shown in FIGS. 4 and 9, these elevator display elements 701 and/or the elevator operating component 702 can be numbers located above the elevator 700, buttons located next to the elevator doors 703, etc. The elevator operating components 702 and elevator display elements 701 are recorded and monitored over time. Influencing factors are recorded which increase the probability that the elevator operating component 702 and/or the elevator display element 701 is actually an elevator operating component 702 or an elevator display element 701. With regard to an elevator display element 701 above the elevator door 703, for example, these influencing factors may be that the numbers identified there change over time, or that the elevator door 703 opens when the number displayed represents the floor number. With regard to elevator operating component 702, this can mean that this elevator operating component 702 is actuated by identified and monitored persons, which means, for example, that the elevator door 703 is opened within a defined period of time from the identification of the actuation time, that the floor numbers above elevator 700 change, etc. The procedure for detecting an elevator operation is, for example, described elsewhere in this document.

In one aspect at least one neural network is trained with such information, e.g. a convolutionary neural network with backward propagation, which sets common features as input variables and the function associated with the feature as output variable. Above this, for example an elevator call button can be evaluated. As input variable serves the detection of the triggering of one or more elevator operating components 702 (described in more detail elsewhere, which in each case means body poses, i.e. orientations of limbs stylized in a skeleton model in space and their movements as well as e.g. the position of elevator operating components 702), as output variable e.g. the travel of elevator 700 in a certain direction (e.g. indicated by an elevator display element 701). Such values are stored in a table and then evaluated, as already described elsewhere in this revelation. As an alternative to a neural network, multinomial logistic regression can also be used. Here, a linear predictor function is used, which determines a score by means of a set of linearly combined node weights, which are multiplied by the input variables as scalar product: score($X_i$, k)=$\beta_k \cdot X_i$ score ($X_i$, k)=$\beta_k X_i$, where $X_i$ is a vector of the input variables for observation i, $\beta_k$ is a weight vector or regression coefficient with respect to the respective output variable k. Again, the score can be converted directly into a probability value that the observation i of the input variables leads to the respective output variable k. A conversion is e.g. possible by means of the command LogisticRegression( ) in SCIKIT-LEARN for Python, e.g. with the additional command multi_class='multinomial' in the brackets. In this case, for example, different elevator operating component triggering events are defined as input variables, elevator travel directions as output variables.

Example 6: Floor Control by the Robot

The robot 1 can be configured in one aspect so that the robot 1, for example, if the robot 1 is in the elevator 700, can scan the environment outside elevator 700 after opening of the elevator door 703. In an alternative aspect, the scanning takes place while leaving elevator 700 and/or after the robot 1 has left the elevator 700.

During this scan, the robot 1 identifies features of the environment in order to store these features with features of the floor stored in the robot memory 820 which in one aspect may be part of the map that the robot 1 uses for navigation. Characteristics that are characteristic of the floor and, in particular, that allow the floor to be distinguished from other floors, are used as a means to verify that the robot 1 is on the floor where it intends to leave the elevator 700. These features can be characteristic shapes of the walls, objects positioned around the elevator area, murals, barcodes (including barcodes that can be read by a LIDAR 34 and are therefore three-dimensional), optical signals emitted on the floor, sound signals, electromagnetic signals such as those emitted by WLAN access points, etc. In one aspect, image analysis methods can also be used to e.g. identify numbers on walls. In one aspect, these features can be provided with coordinates from the map of the robot 1. The robot 1 captures the features in the environment of the elevator 700, compares these captured features with stored features in a database, which is located in the robot memory 820, for example, and which was collected, for example, in the course of a previous mapping, and determines the number of the floor in which the robot 1 is located and compares this number with the floor number of the target floor.

Such a floor check can be used, for example, to verify whether the robot 1 is on the correct floor if the elevator operating components 702 and/or elevator display elements 701 are not recognizable for the robot 1. This control mechanism can also replace in one aspect the addressing of persons to press buttons (step 235) or the evaluation of the elevator operating component (step 425).

Example 7: Door Opening Control

Depending on the size of the elevator 700, the position of the robot 1 within the elevator 700, its spatial orientation, the orientation of its sensors and/or the number of other people and/or obstacles in elevator 700, the robot 1 may not be able to directly detect the opening of the elevator door 703 because there is no direct line of sight between the elevator door 703 the sensors of the robot 1 such as a LIDAR 34 and/or a camera 35 (2D or 3D), ultrasound, radar, etc. In such cases, the robot 1 may detect brightness variations and/or sound signals in one aspect. Fluctuations in brightness can be detected by special optical sensors on the surface of robot 1, e.g. photoresistive sensors, but also a camera 35. Fluctuations in brightness are detected and assigned to these door opening events. Here, in one aspect, the interval after which the brightness fluctuation is detected can be compared with travel intervals of the elevator 700 stored in the robot memory 820, which indicate after which time intervals a door opening typically occurs, in order to more precisely detect the detection of the door opening of the elevator door 703.

Example 8: Weight Estimation by the Robot

If the robot 1 is a transport robot that can transport heavy objects, but as elevators 700 usually have weight restrictions, it is helpful to determine whether the robot 1 would exceed the maximum weight of the elevator load when entering the elevator 700. While it can regularly be assumed that a (transportation) robot 1 with a typical load would not exceed the maximum weight of the elevator load when being configured to use the elevator 700, the situation may be different if there are already objects, including persons, in the elevator 700 and the elevator load is thus derived from these objects and/or persons plus the (transportation) robot 1 with load. FIG. 11 illustrates the process.

In a first step 505, the robot 1 can determine the weight of payloads in step 510 in addition to its own weight, which is stored in robot memory 820, for example in a database. In one aspect, the robot 1 can use a weighing system integrated in the robot (step 514) (or an external scale on which the robot 1 drives and which then informs the robot 1 about the payload weight—step 516), in another aspect it can use weight values 512 stored in robot memory 820 (especially if the robot 1 mostly transports objects with uniform weight). In the latter case, in a supplementary aspect, the robot 1 can first identify the payload via sensors in step 520 (e.g. as a certain type of pallet), i.e. it can first recognize these objects in step 522, classify them in step 524 and then, via a database, assign a weight stored in the robot memory 820 to the identified objects in step 526. The classification is done, for example, analogously to other classifications described in this revelation. The robot 1 then adds this weight of the payload to its own weight in step 530.

Object recognition can be implemented in one aspect by means of the R-CNN method (Girshick et al. 2014; arXiv: 1311.2524). This is done by selective search of candidate regions in which objects are located (Uijlings et al. 2013, DOI: 10.1007/s11263-013-0620-5). In a next step the candidate region can be used e.g. by means of a convolutional neural network to generate a feature vector. Here, e.g. AlexNet can be used, if necessary with a scaling of the input images of the candidate regions to the input size required by AlexNet. The feature vector as output variable consists of 4096 dimensions. These vectors are then classified using a Support Vector Machine. One support vector machine is used for each object class. Thus, a confidence score is determined for each possible object, which indicates the probability that the feature vector represents the respective object. A candidate region is discarded if this region has an "Intersection over Union" overlap, e.g. a higher score that is greater than a learned threshold value. Overall, first the convolutional neural network is trained with training data, then the respective support vector machines. As an alternative to the R-CNN method, the Faster R-CNN method can be used (Ren et al. 2016, DOI: 10.1109/TPAMI.2016.2577031). This object detection can also be used, for example, to identify elevator display elements 701 and elevator operating components 702.

If the robot 1 determines the number of persons in step 535 based on step 310 in FIG. 8, the robot 1 can multiply the number of persons in step 540 by an average person weight 545 stored in the robot memory 820 to estimate the weight of the persons inside the elevator 700. In an optional supplementary aspect, the average person weight is replaced by a more detailed estimate that first identifies persons inside the elevator 700 in step 550, classifies them in step 552 according to their external dimensions (e.g., into a person dimension class consisting of tall and wide persons; one of tall, normal width persons; one of tall and slim persons; one of normal height and width persons; etc) and then, depending on the person dimension class, makes a more precise weight determination per person in step 554 and then adds the weights estimated per person in step 556. Thereby, weights per person dimension class are stored in the robot memory 820 comparable to the average person weight 545. Combinations of these two aspects are also possible.

In one aspect, the robot 1 can also identify additional robots within the elevator 700 in step 560 as a supplement and/or alternative to the persons present in it, derive their weight in step 562 using data stored in robot memory 820 (i.e. comparable to step 545), recognize whether they are transporting a payload (image recognition, classification and comparison with robot memory 820) in step 564, determine the payload weight in step 566 as in step 526 and determine their total weight in step 570. Furthermore, the robot 1 adds up the weight of the person(s) and, if necessary, the weight of the robot still in elevator 700, which results in the weight of all elevator contents in step 575.

The robot 1 adds its own weight plus the weight of its own payload to the old elevator content weight, thus calculating the expected payload weight of the elevator 700 (new elevator content) in step 577 and compares this expected payload weight with a maximum payload weight of the elevator 700 stored in the database in step 579. If the maximum payload would be exceeded by the existing persons (possibly plus the robot 1 already in the elevator 700) by navigating the robot into the elevator 700, the robot 1 does not enter the elevator 700 but waits for the next elevator 700 (or the elevator 700 to return). Alternatively, the robot 1 can ask persons to leave the elevator 700 in step 580 via one of the existing output devices. On the other hand, if the payload weight of the new elevator content is greater than the maximum payload weight, the robot 1 enters the elevator 700 in step 585.

Example 9: Detecting the Number of Floors Based on Acceleration Parameters of the Elevator As described in step 410, the robot 1 scans the environment inside the elevator 700 for elevator display elements 701 and/or elevator operating components 702, from which it can be determined on which floor the robot 1 is located. If this floor cannot be identified, the robot 1 is able to address persons who direct the robot 1 to the correct floor in step 420. An alternative and/or complementary aspect in this respect is to use an inertial sensor 45 to determine the number of floors where the robot 1 is located when, for example, doors 703 open. In this case, a system is implemented that works autonomously in one aspect and does not require elevator parameters, as is the case in EP3453663, where the floor height is an input parameter for the acceleration sensor-based floor detection of a robot.

The system described here uses an inertial sensor 45 inside the robot 1, e.g. an acceleration sensor, which detects the acceleration of the robot 1 e.g. inside the elevator 700, as shown in FIG. 12a) This inertial sensor 45 measures the acceleration in vertical direction in step 605, including the acceleration due to gravity. The measured value is stored in the robot memory 820, e.g. as a predefined value 610 (e.g. 9.81 m/s$^2$). The robot 1 can also determine the value for the acceleration due to gravity by measuring the acceleration outside the elevator 700 if the robot 1 does not move in step 614, or inside the elevator 700 in step 613 if the robot 1 detects that the doors 703 are open (e.g. between steps 440 and 445 in FIG. 9) and the elevator 700 does not move in vertical direction. In both cases, the robot 1 is in a rest position 612.

If the elevator 700 moves one floor lower, the determined acceleration in vertical direction first increases, i.e. it is greater than the acceleration due to gravity, then decreases, reaches the level of the acceleration due to gravity, possibly over a longer period of time if the elevator 700 moves at constant speed, and, if the elevator 700 decelerates, the determined speed drops below the value of the acceleration due to gravity, to then reach this value again when the elevator 700 is at rest. When the elevator 700 goes up one floor, the acceleration detected first drops below the acceleration due to gravity, then reaches it again (for example, when travelling at constant speed), and then rises again when the elevator 700 reduces its speed from the destination floor, to reach the value of the acceleration due to gravity again when the elevator 700 is at rest.

The elevator acceleration, which the robot 1 determines as the difference to the acceleration due to gravity, depends on the height (i.e. the number of floors) and the duration, i.e. the course over the time the elevator travels 700. For example, the height of the acceleration amplitudes can be lower when the elevator 700 travels from the fourth to the fifth floor, but it can be higher when it travels from the first floor to the tenth floor. In the second case, the distance (and thus the time) travelled at constant speed is also greater than in the first case. It follows that characteristic curves occur for journeys between the respective floors when the accelerations are determined over time, i.e. the pattern recorded by the inertial sensor 45 for a journey from the second to the fifth floor differs from the pattern for a journey from the second to the sixth floor. Assuming that all floors have the same height, the pattern of a trip from the third to the sixth floor would be the same as from the second to the fifth floor. The same applies to journeys from higher to lower floors.

The assumptions made here, however, assume that the acceleration curves are always the same when a trip from the second to the fifth floor takes place. However, this depends on the elevator control or the performance of the elevator, so that the acceleration values could change when the elevator payload increases to 700.

The robot 1 is configured in such a way that the robot 1 first learns the elevator travel behavior (see FIG. 12b), i.e. the robot 1 determines the course of the acceleration over time and assigns floor values to these, which is referred to in the following as floor difference-dependent acceleration pattern recognition 620. In concrete terms, this means that when the robot 1 enters the elevator 700, it knows via its navigation system on which floor it is located 625. The robot 1 uses its sensor technology, a LIDAR 34, a camera 35, etc., to detect the closing process of the elevator door 703 (step 630) and starts the acquisition of acceleration values 635 (if it permanently acquires these values, a mark such as a time mark is set as of when the evaluation is to take place). The robot 1 also scans the environment during the time in the elevator 700, as described in step 355, in order to determine on which floor the robot 1 is located 640, or detects in step 440 when the elevator door 703 opens and a stop is made on a floor (step 645). At that moment, the robot 1 also stops recording the acceleration curve over time 650 (or sets a time stamp). Starting and stopping the recording can also mean in one aspect that sampling takes place over this time interval, while the recording of acceleration values continues before and/or after. This allows the robot 1 to map the travel behavior of the elevator 700 by determining the acceleration curves over time between the floors that the elevator 700 travels to and, together with the start and end floor (and thus also a travel direction), storing it in the robot memory 820 (step 655). As a further attribute, the robot 1 can include the determined number of persons (step 315) or, if available, the weight of the new elevator content (step 577) in step 660. In order to smooth the measured values (i.e. especially the curves determined by the inertial sensor 45) 665, a Kalman filter can be used optionally, for example. Alternatively and/or in addition, machine learning methods can also be used as an option in order to equalize/smooth out measurement inaccuracies, e.g. by calculating a regression model in which the measured values serve as the output variable and the determined time intervals, the number of floors, possibly also weight estimates, e.g. the determined number of persons or the weight of the new elevator content, the direction of travel, etc., which are available as corresponding values in tabular form, are used as input variables.

In an optional further step, the robot 1 calculates the differences between the individual floors for which the robot 1 has taken measurements and compares the determined curves with each other, i.e. determines their similarity. Different comparison methods or methods of similarity determination are possible, e.g. the square root of the square sum. If the differences indicate a high similarity, the floors have a constant distance, i.e. the robot 1 does not necessarily has to consider the floor numbers, but can calculate with floor differences (based on a floor number, which e.g. indicates the starting floor).

To determine the floor number in which the robot 1 is located when an elevator door 703 is opened by using the inertial sensor 45 (see FIG. 12c) (step 670), the robot 1 uses the starting floor number in step 625, detects the closing of the elevator door 703 in step 630, starts recording the detected acceleration in step 635 (or sets a marker), detects the opening of the doors in step 645 and stops recording the acceleration values in step 650 (or sets a marker again) when the door opening is detected. In addition, the robot 1 can also include the recorded number of persons (see step 315) and/or the weight of the new elevator contents (see step 577) as further attributes in step 660 and store the recorded number of persons and/or the weight of the elevator contents, together with the starting floor and the course of the acceleration values, over time 675. In one aspect, the recorded measured values of the acceleration courses can also be smoothed in step 665. Afterwards, the course of the acceleration values, the number of the starting floor (if applicable), the direction of travel, the number of persons and/or the weight of the new elevator content is compared with the corresponding attributes of the database 685 created in step 680 in the robot memory 820 to determine the number of the ending floor.

Example 10: Detecting the Number of Floors Based on Door Closing Intervals

As an alternative and/or supplement to example 9, the robot 1 can access time intervals stored in a memory, e.g. the robot memory 820 or the cloud memory 860, which describe, for example, that the journey in the elevator 700 between two floors takes six seconds, measured between the time the door closes and opens, which can be used to determine the floor when the elevator door 703 opens. The values stored in the memory (820, 860) are given as a further attribute the number of persons determined in the elevator 700 or the weight of the new elevator content, which the robot 1 can determine as described elsewhere. Thus, this procedure essentially follows the procedure described in FIGS. 12b and c), with the difference that instead of the acceleration curve over time, only time is recorded. This concerns both the detection process and the learning process and thus complements or substitutes the procedures mentioned in the previous examples.

The determination of the number of floors travelled by an elevator by means of time measurement is characterized here by the following aspects AFT1 to AFT12:

AFT1: A computer-implemented method for determining the floor number where an elevator (700) is located, comprising
  Acquisition of the travelling time of the elevator (700) between floors and
  Use the starting floor number of the starting floor.

AFT2: Computer-implemented method according to AFT1, further comprising
  Detection of the opening and/or closing of the elevator door (703)
  Use of the closing of the elevator door (703) as a starting value for the acquisition of the travelling time and/or
  Use of the opening of the elevator door (703) as the end value for the acquisition of the travelling time.

AFT3: Computer-implemented method according to AFT1, further comprising detection of the opening and/or closing of the elevator door (703) of the elevator (700) over time.

AFT4: Computer-implemented method according to AFT1, further comprising
  Recording and detection of persons inside the elevator (700);
  Determination of the weight of the elevator contents based on the persons.

AFT5: Computer-implemented method according to AFT4, whereby the recorded persons are classified with regard to their external dimensions and a weight is assigned to each person based on the classification.

AFT6: Computer-implemented method according to AFT5, where the determined weights of each person are added up and the sum represents the weight of the elevator contents.

AFT7: Computer-implemented method according to AFT1, further comprising
  Recording of travelling times between floors over time
  Comparison of the recorded travelling times with stored travelling times.

AFT8: Computer-implemented method according to AFT7, whereby the determined weight of the elevator contents is taken into account in this comparison.

AFT9: Computer-implemented method according to AFT7, further comprising determination of floor differences based on the determined travelling times.

AFT10: Computer-implemented method according to AFT7, further comprising detection of the direction of movement of the elevator (700).

AFT11: Computer-implemented method according to AFT7, further comprising the determination of the target floors based on the number of the starting floors and the determined floor difference.

AFT12: Device for carrying out the method according to AFT1-AFT11.

Example 11: Receiving Unit for Triggering a Sensing Event

In the above descriptions, as long as no person can be addressed in front of elevator 700, no person reacts to the address and/or no one on the floor leaves the elevator 700, the robot 1 is dependent on waiting until one of these three events occurs. To speed up the waiting time if none of these three events occurs, the robot 1 is configured in one aspect so that the robot 1 can send a signal to a signaling system 900, which has an interface 930 and a receiver unit 920, via a wireless interface 38, as shown in FIG. 13. This signaling system 900 is located inside the elevator 700 and signals people inside the elevator 700 to select a specific floor where the elevator 700 stops, namely the floor where the robot 1 is located. For this purpose, the signaling system 900 is equipped with an output unit 910, which can be used to signalize by means of optical and/or acoustic signals, e.g. as an indication on a display to select a certain floor, or as a voice output via a loudspeaker.

Communication between the robot 1 and the signaling system 900 can be carried out in at least one of the ways described below: One possible way is communication by radio signals. However, these may be difficult to receive inside the elevator 700, especially if it is largely encased in metal. For this reason, sound signals can also be used as an alternative means of communication. These are, for example, sound signals in the inaudible range such as ultrasound or infrasound. Alternatively, transmission can also occur via light, e.g. in elevators 700 with glazing.

The type of signal transmission can be different. On the one hand, the signal can depend on the frequency, it can be transmitted by packet transmission, it can be differently pulsed and/or modulated and/or have a different intensity.

The transmission paths can be designed differently, as also shown in FIG. 13. There can be a direct transmission between the robot 1 and the signaling system 900. Alternatively and/or in addition, instead of the robot 1 as transmitter towards the signaling system 900, a separate unit, shown as repeater 940, can be used, which is located near the elevator 700 and which is wirelessly connected to the robot 1 and signaling system 900. Alternatively and/or in addition, a system, e.g. a management system 950, can also be directly connected to the signaling system 900 and trigger the signaling. Alternatively and/or in addition, a management system 950 triggers the robot 1 to, in turn, trigger the signaling system 900 directly or via the repeater and/or a management system 950 triggers the repeater 940, which in turn triggers the signaling system 900. On the basis of the triggering, a signal is sent to the persons who are in the elevator 700 and who are stimulated by the output unit to operate certain elevator operating components 702.

Example 12: Determining Waiting Positions and Space Requirements

The robot 1 is equipped with at least one environment perception sensor 46, a navigation module 10 and an output device such as a display 37 and/or a loudspeaker 42. These devices allow the robot 1 to instruct people in its environment to operate an elevator 700, which involves selecting a floor specified by the robot 1 and/or indicating the direction of travel desired by the robot 1 when calling the elevator 700.

The robot 1 occupies a waiting position (robot position 750) in front of an elevator 700, which is characterized by a low probability that objects will move over this position. Ther robot 1 can determine such robot positions 750 by scanning the environment in front of an elevator 700 over time for moving objects and storing the time and position of the objects in a location and time resolved manner, as already explained above. The stored information is evaluated in a location- and time-resolved manner, either by the robot 1 or a system to which the robot 1 transfers the data. The evaluation includes the determination of the probability of the occurrence of moving objects on a seasonal basis, i.e. in the course of a day or week, for example. The evaluation also includes the evaluation depending on the opening times of the elevator door 703. The dependent probabilities (including the probabilities for the opening times of the elevator door 703 and possibly also seasonally dependent) are e.g. stored in a map of the map module 11.

The robot 1 has a motion planner 16, which also determines the waiting position in front of an elevator 700 by optimizing various cost functions. This includes the probability that there are moving objects such as persons on the position (see the example of recording and evaluating flows of people, which creates maps that, depending on seasonal aspects (e.g. time of day, day of the week), show the probability of the presence of moving objects, including the probability of the presence of a person on the position); the position of the robot 1 relative to the distance to the elevator door 703, which is dependent on the speed and/or acceleration of robot 1; the proportion of the detectable area of the elevator interior from the position of the robot 1; and/or the opening duration, closing duration and/or time interval during which elevator doors 703 are open.

The robot 1 can record and evaluate the behavior of an instructed person via at least one environment perception sensor 46, e.g. a camera 35, whose images are evaluated by the robot computer 810 in such a way that the robot 1 creates a skeleton model of the person and monitors the position of the fingers within the skeleton model in three-dimensional space over time. Furthermore, the robot 1 can detect the elevator operating components 703 for an elevator 700 in three-dimensional space and also track them over time. To do this, the robot 1 uses classification algorithms stored in a memory (820 or 860) to detect the elevator operating components 703. Using the determined position of the elevator operating components 703 and the fingers in the three-dimensional space, the robot 1 determines the distance between the elevator operating components 703 and the fingers of the detected and monitored person. If the distance falls below a distance threshold, an event is registered. The event is registered as calling the elevator 700 and/or selecting a floor.

The robot 1 is further configured in such a way that the robot 1 has at least one environment perception sensor 46 that detects the indication of a floor and/or the direction of travel of elevator 700 via an elevator display element 701 and for this purpose the at least one detected elevator display element 701 is evaluated and interpreted by means of image classification methods. The determined travel direction of the elevator 700 and/or the selected floor number is compared with the information stored in the robot 1 to the travel destination of the robot 1. The robot 1 instructs another person to operate the elevator 700 if no call of the elevator 700 and/or selection of a floor was detected.

The robot 1 can also scan the area inside the elevator 700, determine an area free of objects and compare it to a value stored in memory (820 or 860) to determine if there is enough space inside the elevator 700 for the robot 1.

The robot 1 finally exits the elevator 700 when the floor number detected matches the target floor number stored in memory (820 or 860). The robot 1 can also determine the floor number within an elevator 700 in one aspect by means of inertial sensor 45 or time elapsed since closing the elevator door 703.

Example 13: Determining Space Requirements

The robot 1 is equipped with at least one robot processing unit 815, at least one robot memory 820 and at least one environment perception sensor 46, with which the robot 1 scans the interior of an elevator 700, detects objects inside the elevator 700 and determines the area not occupied by these objects and compares it with an area stored in a memory (820, 860). The latter area is at least equal to the floor space of the robot 1, but may be larger in order to maintain a distance between the robot 1 and the people or objects inside elevator 700. The robot 1 determines the number of persons inside the elevator 700 by creating skeleton models of one aspect of the number of persons based on data collected with the environment perception sensor 46 like a camera 35, as known from the prior art.

In an alternative and/or complementary aspect, the robot 1 determines the number of persons by triangulating data from the LIDAR 34 (which, for example, acts as an environment detection sensor 46), whereby the LIDAR 34 detects the position of the legs, for example. Triangulation at this point means that the robot 1 scans the interior of the elevator 700 from several positions to determine whether the obstacles are of a different type or whether the legs are covered by the LIDAR 34. The number of persons is determined, for example, by the number of legs and/or the number of heads. The robot 1 also uses information stored in a memory (820, 860) that describes the space requirements of a person and determines the space requirements of the persons in the elevator 700 by multiplying the number of persons by the space requirements per person. The robot 1 thus determines the space that the persons in the elevator can occupy. This area is compared with the area of the elevator 700, which is stored in a memory (820, 860), and the difference between the elevator area and the result of the multiplication is calculated, i.e. the area required by the persons in the elevator 700. The robot 1 enters the elevator 700 if the difference is greater than the above-mentioned area occupied by the robot 1.

The robot 1 also has an output unit with a display 37 and/or a speaker 42, configured so that the robot 1 can instruct people in its environment to operate an elevator 700 via the output unit. The robot 1 can also determine the number of floors within the elevator 700 by detecting the elevator operating component 702 and/or elevator display elements 701, in an alternative and/or complementary aspect by means of the inertial sensor 45.

Example 14: System for Learning Floor Difference Dependent Acceleration Patterns of an Elevator In a system for learning floor difference dependent acceleration patterns of the elevator 700, which records its acceleration over time, one aspect of the system is a robot 1. The system detects the opening and closing processes of the elevator door 703 by means of at least one sensor (e.g. by means of an environment perception sensor 46), evaluates the closing process of the elevator door 703 as the starting value for the acquisition of the acceleration, the opening process of the elevator door 703 as the final value for the acquisition of the acceleration, or acquires the opening and closing process of the elevator door 703 over time. Furthermore, the system captures the elevator display elements 701 and/or the elevator operating components 702 within an elevator 700, whereby the data acquired in this way is classified and interpreted to determine the floor number. This floor number number is determined during the opening and/or closing processes of the elevator door 703. This provides data on the acceleration of the robot 1 over time and corresponding data on the start and end floors between which the elevator moves at the determined interval.

Then the floor difference between the closing process of the elevator door 703 and the opening process of the elevator door 703 is determined. In one aspect, the system can determine the weight of the elevator contents, mainly based on the number of people in elevator 700. For this purpose, the system determines the number of people using the environment perception sensor 46 and, for example, creates skeletal models of the people in elevator 700 based on the data collected.

Alternatively and/or in addition, the system includes the number of persons via triangulation of data from a LIDAR 34 (which e.g. acts as the environment perception sensor 46), e.g. on the robot 1 or in the elevator 700 itself, whereby the LIDAR 34 determines the position of the legs, for example. The number of persons is then determined by the number of legs and/or the number of heads. Furthermore, the number of persons is multiplied by a value that represents the average weight of a person. Alternatively and/or in addition, the acquired sensor data, especially those used to create a skeleton model, are classified and compared with values that describe the dimensions of a person. These dimensions are classified in such a way that by means of the classification a weight is assigned to each person, whereby then the determined weights of each person are added. Finally, the weight of the system stored in a memory (820, 860) is added to the determined weight of the person in order to determine the weight of the elevator contents and the result is stored in a memory (820, 860).

The values recorded are evaluated and acceleration curves are determined for floor differences, which depend in one aspect on the starting floor and in a supplementary aspect on the weight of the elevator contents. These acceleration curves are also assigned to time sequences. Thus, the acceleration curve, the floor difference, the start floor, the elevator weight and/or the number of persons in the elevator 700 result as input variables for the tabular values, whereby the acceleration curves can be broken down into further variables such as duration, amplitude, skewness, kurtosis, etc. The target floors, for example, serve as output variables.

Example 15: System for Determining the Number of Floors in the Elevator

A system, in one aspect a robot 1, is configured so that if it is in an elevator 700, it can determine the floor number where the elevator 700 stops by detecting and evaluating its acceleration over time. To do this, the system uses information on the starting floor, detects the opening and/or closing of the elevator door 703 by means of an environment perception sensor 46, uses the closing of the elevator door 703 as the starting value for detecting acceleration, the opening of the elevator door 703 as the final value for detecting acceleration, or detects the opening and closing of the elevator door 703 over time.

In one aspect, the system determines the weight of the elevator contents, primarily based on the number of people in elevator 700. For this purpose, the system determines the number of persons by means of an environment sensor 46, which scans the environment of the system and creates skeletal models of the persons in the elevator 700 on the basis of the collected data. Alternatively and/or additionally, the system includes the number of persons by triangulating data from a LIDAR 34 (which e.g. acts as an environment sensor 46), whereby the LIDAR 34 e.g. determines the position of the legs. The number of persons is then determined by the number of legs and/or the number of heads. Furthermore, the number of persons is multiplied by a value that represents the average weight of a person. Alternatively and/or in addition, the acquired sensor data, especially those used to create a skeleton model, are classified and compared with values that describe the dimensions of a person. These dimensions are classified in such a way that by means of the classification a weight is assigned to each person, whereby then the determined weights of each person are added. Finally, the weight of the system stored in a memory (820, 860) is added to the determined weight of the person in order to determine the weight of the elevator content and the result is stored in a memory (820, 860).

The system records the acceleration curves over time and compares these acceleration curves with acceleration curves and/or time curves stored in a memory (820, 860). In one aspect, the determined weight of the elevator contents is taken into account in this comparison. Floor differences are determined on the basis of the comparison. In one aspect, the travel direction of the elevator 700 is taken into account. Based on the number of the start floor and the determined floor difference, the destination floor is computed, which is then compared with the target floor from the job conducted by the robot 1.

The system is further configured so that the system is equipped with at least one environment perception sensor 46 to detect its environment, a navigation module 10 and an output unit such as a display 37 and/or a loudspeaker 42 that allow instructing people in its vicinity to operate the elevator 700. The system also scans the interior of the elevator 700 through the at least one environment perception sensor 46 to detect objects inside the elevator 700 and to determine the area not occupied by these objects and compare it with an area stored in a memory (820, 860).

Example 16: Procedure and Device for Positioning a Robot in Front of an Elevator The procedure and device for positioning a robot 1 in front of an elevator 700 is here characterized by the following aspects APRA1 to APRA8:

APRA1. A computer-implemented method for positioning a robot (1) in front of an elevator (700), comprising Optimization of at least one cost function Determination of a waiting position (robot position 750) for the robot (1); and Positioning of the robot (1) on the waiting position (robot position 750).

APRA2. Computer-implemented method according to APRA1, where the optimization of the cost function includes a probability that there is at least one moving object on the waiting position (robot position 750).

APRA3. Computer-implemented method according to APRA1, where a cost function comprises the evaluation of the distance of the robot (1) to the elevator door (703).

APRA4. Computer-implemented method according to APRA3, where the distance depends on the speed and/or acceleration of the robot (1).

APRA5. Computer-implemented method according to APRA1, wherein the optimization of a cost function comprises the evaluation of a portion of the detectable area of the elevator interior from the robot position (750).

APRA6. Computer-implemented method according to APRA5, whereby the detectable area is maximized by repositioning the robot (1).

APRA7. Computer-implemented method according to APRA1, wherein the optimization of a cost function comprises the optimization of the opening duration, closing duration and/or the time interval during which the elevator doors (703) are open.

APRA8. Device for carrying out the method according to APRA1-APRA7.

Example 17: Determination of Space Requirements

The space requirement determination is characterized here by the following aspects AF1 to AF12:

AF1. A computer-implemented method for determining space requirements, comprising
Scanning a room;
Detection of objects within the room;
Detection of the area not occupied by these objects; and
Comparison of the determined area with a first area.

AF2. Computer-implemented method according to AF1, where the room is the interior of the car of an elevator (700).

AF3. Computer-implemented method according to AF1, where the first surface is at least the footprint of a robot 1.

AF4. Computer-implemented method according to AF1, whereby the detected objects are persons.

AF5. Computer-implemented method according to AF4, further comprising the determination of the number of persons in the room.

AF6. Computer-implemented method according to AF5, whereby the number of persons in the room is determined on the basis of skeleton models.

AF7. Computer-implemented method according to AF5, further comprising calculation of an area, which the persons in the elevator (700) can occupy, from the number of determined persons and an area value, which corresponds to the expected area of a person.

AFB. Computer-implemented method according to AF7, where the difference between the area of the room and the calculated area is computed.

AF9. Computer-implemented method according to AFB, further comprising triggering an event if the difference between the area of the room and the calculated area is larger than the first area.

AF10. Computer-implemented method according to AF9, where triggering an event corresponds to the entry of the robot (1) into the elevator (700).

AF11. Computer-implemented method according to AF9, where triggering an event comprises an output that prompts people to step aside.

AF12. Device for carrying out the method according to AF1-AF11.

Example 18: Inertial Sensor

The use of an inertial sensor is characterized here by the following aspects AIN1 to AIN19:

AIN1. A computer-implemented method for learning floor difference dependent acceleration patterns of an elevator (700), comprising the acquisition of the acceleration of the elevator (700) over time.

AIN2. Computer-implemented method according to AIN1, further comprising the detection of at least one opening and/or closing operation of an elevator door (703) of the elevator (700).

AIN3. Computer-implemented method according to AIN2, whereby the closing process of the elevator door (703) starts the measurement or evaluation of the acceleration.

AIN4. Computer-implemented method according to AIN2, whereby the opening process of the elevator door (703) end the measurement or evaluation of the acceleration.

AIN5. Computer-implemented method according to AIN2, further comprising the detection of opening and/or closing of the elevator door (703) of the elevator (700) over time.

AIN6. Computer-implemented method according to AIN1, further comprising
Sensing of the elevator display elements 701 and/or elevator operating components (702) inside the elevator (700);
Interpretation of the elevator display elements 701 and/or elevator operating components (702) located within the elevator (700);
Determination of the floor number.

AIN7. Computer-implemented method according to AIN6, wherein the detection of the elevator display elements (701) and elevator operating components occurs during the opening and/or closing of the elevator door (703).

AIN8. Computer-implemented method according to AIN2, further comprising determining the floor difference between the closing of the elevator door (703) and the opening of the elevator door (703).

AIN9. Computer-implemented method according to AIN1, further comprising determination of the weight of the elevator contents.

AIN10. Computer-implemented method according to AIN9, whereby the weight of the elevator content is determined on the basis of capture persons who are in the elevator (700).

AIN11. Computer-implemented method according to AIN10, further comprising the determination of the number of persons in the elevator 700 on the basis of a creation of skeleton models.

AIN12. Computer-implemented method according to AIN11, further comprising multiplying the number of persons determined by a value representing the average weight of a person, the product thus determined representing the weight of the elevator contents.

AIN13. Computer-implemented method according to AIN10, further comprising the
Classification of the recorded persons with regard to their external dimensions and
Assigning of a weight to each person based on the classification.

AIN14. Computer-implemented method according to AIN13, further comprising addition of the weights assigned to the persons, the sum representing the weight of the elevator contents.

AIN15. Computer-implemented method according to AIN8, further comprehensive the determination of acceleration curves for floor differences.

AIN16. Computer-implemented method according to AIN15, whereby the determined weight of the elevator contents is taken into account when determining the acceleration curves.

AIN17. Computer-implemented method according to AIN15, whereby the starting floor is taken into account when determining the acceleration curves.

AIN18. Computer-implemented method according to AIN15, whereby the direction of movement of the elevator (700) is taken into account when determining the acceleration curves.

AIN19. Device for carrying out the method according to AIN1-AIN18.

Example 19: Determining the Number of Floors Travelled by an Elevator

The determination of the number of floors travelled by an elevator is characterized here by the following aspects AEEA1 to AEEA12:

AEEA1: A computer-implemented method for determining the floor number where an elevator (700) is located, comprising
- Acquisition of the acceleration of the elevator (700) over time and
- Use the starting floor number of the starting floor.

AEEA2: Computer-implemented method according to AEEA1, further comprising
- Detection of the opening and/or closing of the elevator door (703)
- Use of the closing of the elevator door (703) as a starting value for the detection of an acceleration and/or
- Use of the opening of the elevator door (703) as the final value for recording the acceleration.

AEEA3: Computer-implemented method according to AEEA1, further comprising detection of the opening and/or closing of the elevator door (703) of the elevator (700) over time.

AEEA4: Computer-implemented method according to AEEA1, further comprising
- Recording and detection of persons inside the elevator (700);
- Determination of the weight of the elevator contents based on the persons.

AEEA5: Computer-implemented method according to AEEA4, whereby the recorded persons are classified with regard to their external dimensions and a weight is assigned to each person based on the classification.

AEEA6: Computer-implemented method according to AEEA5, where the determined weights of each person are added up and the sum represents the weight of the elevator contents.

AEEA7: Computer-implemented method according to AEEA1, further comprising
- Recording of acceleration curves over time
- Comparison of the recorded acceleration curves with stored acceleration curves.

AEEA8: Computer-implemented method according to AEEA7, whereby the determined weight of the elevator contents is taken into account in this comparison.

AEEA9: Computer-implemented method according to AEEA7, further comprising determination of floor differences based on the determined acceleration curves.

AEEA10: Computer-implemented method according to AEEA7, further comprising detection of the direction of movement of the elevator (700).

AEEA11: Computer-implemented method according to AEEA7, further comprising the determination of the target floors based on the number of the starting floors and the determined floor difference.

AEEA12: Device for carrying out the method according to AEEA1-AEEA11.

Example 20: Separate Unit within the Elevator (Signaling System)

The separate unit (signaling system 900) within the elevator is here characterized by the following aspects ASS1 to ASS9:

ASS1. A signaling system (900) for triggering an elevator operation, comprising an interface (930), an output unit (910) for transmitting instructions to persons present in the elevator (700), wherein the signaling system (900) is located within an elevator (700).

ASS2. Signalling system (900) according to ASS1, wherein the instructions describe the operation of at least one elevator operating component (702).

ASS3. Signalling system (900) according to ASS1, further comprising a connection of the signalling system (900) to at least one robot (1) via the at least one interface (930).

ASS4. Signalling system (900) according to ASS1, further comprising a connection of the signalling system (900) via the at least one interface (930) to a second system, which in turn is connected to a robot (1).

ASS5. Signalling system (900) according to ASS4, wherein the second system is a repeater (940) which receives instructions from a third system via at least one interface.

ASS6. Signalling system (900) according to ASS5, whereby the third system is a management system (950) which transmits instructions to the robot (1).

ASS7. Signalling system (900) according to ASS1, wherein sound signals or light signals are transmitted via the at least one interface (930) of the signalling system (600).

ASS8. Signalling system (600) according to ASS1, wherein the at least one interface (930) is a unidirectional interface.

ASS9. Signalling system (600) according to ASS8, whereby the signalling system (600) can only receive signals via the interface (930).

Example 21: Robot Conveying System

The robot conveying system is here characterized by the following aspects RCS1 to RCS4:

RCS1: System for conveying a robot (1) in an elevator (700) to a predetermined floor, comprising:
- at least one environment perception sensor (46);
- an output unit for issuing prompts to persons in the elevator (700); and
- rules for recognizing a selected floor by comparing the captured images with stored patterns;
- wherein the environment perception sensor (46) allows capturing images of an elevator operating component (703) in the elevator (700).

RCS2: System according to RCS2, further comprising a person recognition module (20) for the creation of skeleton models of the persons.

RCS3: System according to RCS1-2, further comprising at least one memory (820, 860), wherein the at least one memory comprises at least rules for detecting the distance between an elevator operating component (702) and a body part, rules for detecting the operation of the elevator (700), rules for detecting the direction of movement of the elevator (700), rules for detecting the target floor of the elevator (700), rules for selecting a robot position (750) for placing the robot (1) in front of an elevator door (703), and/or rules for determining the free area within the elevator (700).

RCS4: System according to RCS1-3, further comprising an inertial sensor (45).

FIGURE DESCRIPTION

1 Robot
5 Software level
10 Navigation module
11 Map Module
12 Environment sensing module
13 Path planning module (metric path planning)
14 Self-blockade detection module
15 Localization Module
16 Motion planner
17 Waiting position determination module
18 Mapping module 19 Energy monitoring module
20 Person recognition module
21 Person identification module
22 Visual person tracking module
23 Laser-based person tracking module
24 Skeleton model creation module
30 Hardware level
31 Odometry unit
32 Pressure sensitive bumpers
33 Infrared ToF sensors
34 LIDAR
35 Camera
36 Control elements
37 Display
38 Wireless interface
39 Differential drive
40 Charging port and charging electronics
41 Control
42 Loudspeaker
43 Microphone
44 Motor control
45 Inertial sensor
46 Environment perception sensor
700 Elevator
701 Elevator display element
702 Elevator operating component
703 Elevator door
704 Wall
710 First aisle
715 Wide aisle
720 Wall
750 Robot position
805 Wheel
810 Robot computer
815 Robot processing unit
820 Robot memory
825 Accumulator
830 Controller processing unit
835 Memory of the control
850 cloud server
855 cloud processing unit
860 cloud memory
900 Signaling system
910 Output unit
920 Receiving unit
930 Interface
940 Repeater
950 Management System

The invention claimed is:

1. A computer-implemented method for monitoring an elevator comprising a robot,
wherein the robot comprises a sensor system and at least one output unit, and
wherein the computer-implemented method comprises:
the robot leveraging the sensor system to detect one or more persons in a vicinity of the robot;
the robot leveraging the sensor system to detect an elevator operating component for the elevator;
the robot leveraging the sensor system to monitor the elevator operating component;
the robot leveraging the sensor system to detect a selected floor based on said leveraging of the sensor system to monitor the elevator operating component; and
the robot leveraging the at least one output unit to prompt at least one of the one or more detected persons to select a predetermined floor using the elevator operating component.

2. The method according to claim 1, wherein the robot leveraging the sensor system to monitor the elevator operating component comprises the robot leveraging the sensor system to monitor body part positions of at least one of the one or more detected persons when selecting the selected floor using the elevator operating component.

3. The method according to claim 2, wherein:
the robot leveraging the sensor system to monitor comprises the robot leveraging the sensor system to determine a distance between the elevator operating component and the body part positions of the at least one of the one or more detected persons.

4. The method according to claim 3, further comprising:
triggering an event when the distance between the elevator operating component and the body part positions of the at least one of the one or more detected persons falls below a threshold value.

5. The method according to claim 4, wherein the event comprises at least one of the group of calling the elevator, selecting the predetermined floor, or requesting one of the one or more persons in the vicinity of the robot to select the predetermined floor using the elevator operating component.

6. The method according to claim 1, wherein the robot leveraging the sensor system to detect one or more persons in the vicinity of the robot comprises the robot leveraging a person-recognition module thereof to create a skeleton model of at least one person of the one or more persons in the vicinity of the robot.

7. The method according to claim 6, wherein the robot leveraging the sensor system to monitor the elevator operating component is carried out on the basis of recorded joint points from the skeleton model.

8. The method according to claim 1, wherein the robot leveraging the sensor system to monitor the elevator operating component includes the robot capturing an image and classifying the captured image.

9. The method according to claim 1, further comprising:
the robot leveraging the sensor system to detect an elevator display element; and
the robot accessing memory associated with the robot and a classification database stored in the memory to identify a floor at which the elevator is located based upon the detected elevator display element.

10. The method according to claim 9, further comprising:
the robot leveraging the memory to compare the identified floor at which the elevator is located with the predetermined floor based upon patterns stored in the memory.

11. The method according to claim 1, further comprising:
the robot leaving the elevator based upon the comparing of the identified floor at which the elevator is located with the predetermined floor upon reaching the predetermined floor.

12. The method according to claim 1, further comprising:
the robot leveraging a motion planner to place the robot in a robot position in front of the elevator, wherein the leveraging of the motion planner selects the robot position such that a distance between the robot position and an elevator door from the elevator depends on a predetermined speed of the robot and an opening time of the elevator door or on the probability of hitting a moving obstacle.

13. The method according to claim 1, further comprising:
the robot leveraging the sensor system to determine whether the elevator has a free area sufficiently large to receive the robot in the elevator; and the robot determining whether to enter the elevator based upon the determination of whether the elevator has the free area sufficiently large to receive the robot in the elevator.

14. The method according to claim 1, wherein when the elevator is located on a first floor that is different than a second floor at which the robot is located, the method further comprises:
the robot sending a signal to a signaling system located in the elevator, the signal system comprising a receiving unit and an output unit; and
leveraging the output unit of the signaling system to, upon receiving the signal, signal at least one person on the elevator to actuate the elevator operating component to select the second floor on which the robot is located.

15. A robot comprising:
a sensor system configured to:
detect one or more persons in a vicinity of the robot;
detect an elevator operating component for the elevator;
monitor the elevator operating component; and
detect a selected floor based on the monitored elevator operating component; and
an output unit configured to prompt at least one of the one or more detected persons to select a predetermined floor using the elevator operating component.

16. The robot according to claim 15, wherein the sensor system is configured to monitor body part positions of the at least one of the one or more detected persons when selecting the floors using the elevator operating component.

17. The robot according to claim 16, wherein the sensor system is configured to determine a distance between the elevator operating component and the body part positions of the at least one of the one or more detected persons.

18. The robot according to claim 15, wherein the sensor system comprises a person-recognition module configured to create a skeleton model of the at least one person of the one or more persons in the vicinity of the robot.

19. The robot according to claim 18, wherein the sensor system is configured to monitor the elevator operating component based on recorded joint points from the skeleton model.

20. The robot according to claim 15, further comprising:
a transmitter configured to send a signal to a signaling system located in the elevator when the elevator is located at a first floor that is different than a second floor on which the robot is located, wherein signaling system comprises a receiving unit and an output unit, and wherein the output unit is configured to signal at least one person on the elevator to actuate the elevator operating component to select the second floor on which the robot is located.

\* \* \* \* \*